US012571411B2

(12) United States Patent
Shah et al.

(10) Patent No.: US 12,571,411 B2
(45) Date of Patent: Mar. 10, 2026

(54) METHODS AND APPARATUS TO REMOVE LIQUID FROM A HOUSING

(71) Applicant: General Electric Company, Schenectady, NY (US)

(72) Inventors: Shishir Paresh Shah, Bengaluru (IN); Ravindra Shankar Ganiger, Bengaluru (IN); Adam Joseph Wangler, West Chester, OH (US); David Justin Brady, Rockport, MA (US)

(73) Assignee: General Electric Company, Evendale, OH (US)

( * ) Notice: Subject to any disclaimer, the term of this patent is extended or adjusted under 35 U.S.C. 154(b) by 182 days.

(21) Appl. No.: 18/356,754

(22) Filed: Jul. 21, 2023

(65) Prior Publication Data

US 2024/0410398 A1 Dec. 12, 2024

(30) Foreign Application Priority Data

Jun. 6, 2023 (IN) .............................. 202311038805

(51) Int. Cl.
| | |
|---|---|
| *F04F 5/52* | (2006.01) |
| *F02C 7/06* | (2006.01) |
| *F16N 13/00* | (2006.01) |

(52) U.S. Cl.
CPC .................. *F04F 5/52* (2013.01); *F02C 7/06* (2013.01); *F16N 2013/006* (2013.01)

(58) Field of Classification Search
CPC ........ F04F 5/52; F02C 7/06; F16N 2013/006; F16N 2210/14
See application file for complete search history.

(56) References Cited

U.S. PATENT DOCUMENTS

| | | | | |
|---|---|---|---|---|
| 2,493,120 | A | | 1/1950 | Eaton |
| 3,147,913 | A | * | 9/1964 | David ..................... F01D 25/18 |
| | | | | 415/176 |

(Continued)

FOREIGN PATENT DOCUMENTS

| | | | |
|---|---|---|---|
| AT | 75041 B | * | 12/1918 |
| FR | 2778630 | | 11/1999 |
| WO | 2011051493 | | 5/2011 |

OTHER PUBLICATIONS

"Hydroejector/Eductor Jet Pump with Venturi vacuum effect especially designed for PAC and micro-sand," Sodimate, article, retrieved May 30, 2023, 8 pages. [retrieved from: https://sodimate-inc.com/pac-microsand-liquid-eductor-jet-pump/].

*Primary Examiner* — Nathan C Zollinger
(74) *Attorney, Agent, or Firm* — Hanley, Flight & Zimmerman, LLC

(57) ABSTRACT

Methods and apparatus to remove liquid from a housing are disclosed. An example system includes a pump including a chamber, a shaft positioned at least partially in the chamber, and a bearing to support the shaft, the chamber including a chamber inlet and a chamber outlet, the chamber to hold a fluid in a first state, a first conduit to carry the fluid in a second state of the fluid, the first conduit fluidly coupled to the chamber inlet, a second conduit to carry the fluid in the first state of the fluid, the second conduit fluidly coupled to the chamber outlet, at least one jet pump to deliver a mixture of the fluid in the first state of the fluid and the second state of the fluid to a third conduit, and a heat exchanger coupled to the first conduit upstream of the first inlet.

25 Claims, 7 Drawing Sheets

(56)                    References Cited

U.S. PATENT DOCUMENTS

| | | | | |
|---|---|---|---|---|
| 3,531,323 | A | 9/1970 | Carpenter et al. | |
| 5,287,694 | A * | 2/1994 | Davis | F04F 5/16 |
| | | | | 60/785 |
| RE36,796 | E | 8/2000 | Sato et al. | |
| 7,186,093 | B2 * | 3/2007 | Goshi | F04D 7/02 |
| | | | | 310/90 |
| 8,215,895 | B2 * | 7/2012 | Henry | F01D 25/18 |
| | | | | 415/111 |
| 8,479,396 | B2 | 7/2013 | Streit et al. | |
| 9,446,548 | B2 | 9/2016 | Sehlleier | |
| 11,125,244 | B2 * | 9/2021 | Pawellek | F04D 13/06 |
| 2011/0203615 | A1 | 8/2011 | Lindqvist et al. | |
| 2013/0068253 | A1 | 3/2013 | Gonzalez et al. | |

* cited by examiner

METHODS AND APPARATUS TO REMOVE LIQUID FROM A HOUSING

RELATED APPLICATION

This patent claims the benefit of Indian Provisional Patent Application No. 202311038805, which was filed on Jun. 6, 2023. Indian Provisional Patent Application No. 202311038805 is hereby incorporated herein by reference in its entirety. Priority to Indian Provisional Patent Application No. 202311038805 is hereby claimed.

FIELD OF THE DISCLOSURE

This disclosure relates generally to fluid systems and, more particularly, to methods and apparatus to remove liquid from a housing.

BACKGROUND

Aircraft typically include various accessory systems supporting the operation of the aircraft and/or its gas turbine engine(s). For example, such accessory systems may include a lubrication system that lubricates components of the engine(s), an engine cooling system that provides cooling air to engine components, an environmental control system that provides cooled air to the cabin of the aircraft, and/or the like. As such, heat is added or removed from a fluid (e.g., oil, air, etc.) during operation of these accessory systems.

BRIEF DESCRIPTION OF THE DRAWINGS

A full and enabling disclosure of the presently described technology, including the best mode thereof, directed to one of ordinary skill in the art, is set forth in the specification, which makes reference to the appended figures, in which.

In general, the same reference numbers will be used throughout the drawing(s) and accompanying written description to refer to the same or like parts. The figures are not necessarily to scale.

DETAILED DESCRIPTION

Figure 1:
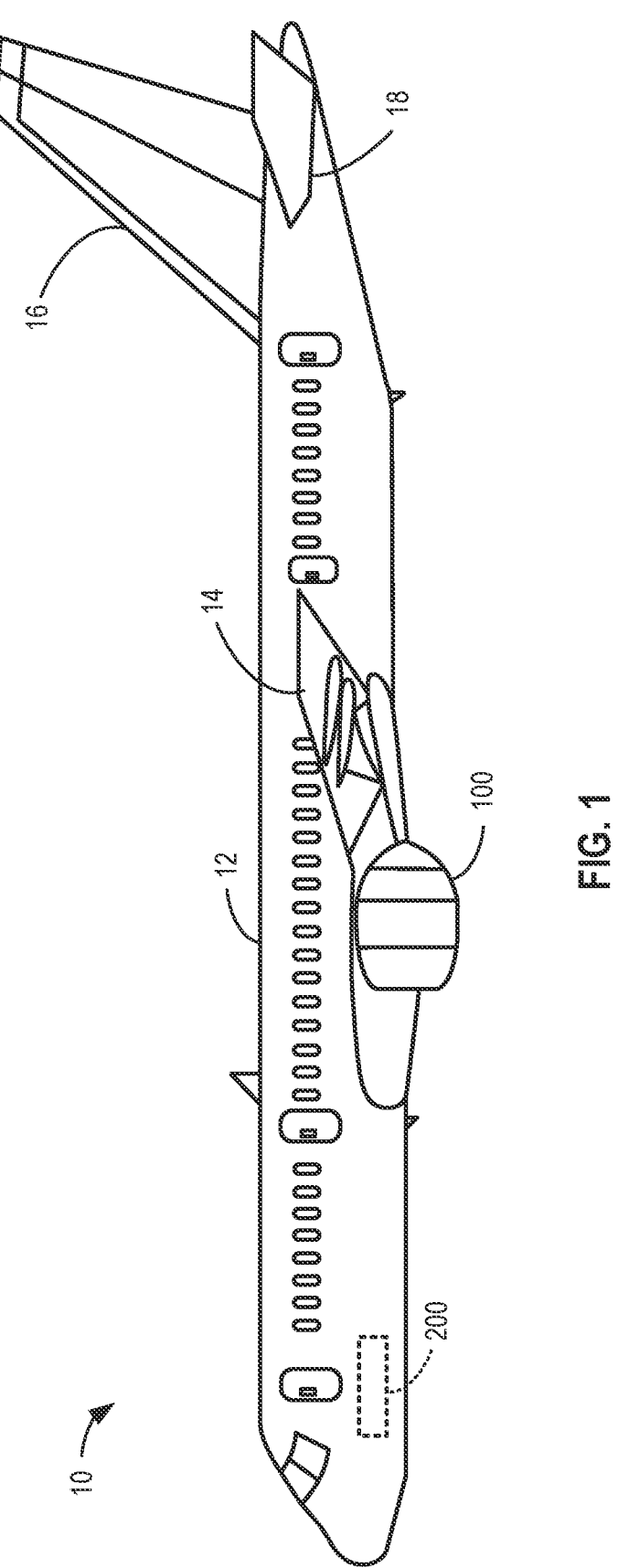
FIG. 1 is a side view of an example aircraft.

As used herein, connection references (e.g., attached, coupled, connected, fixed, joined, etc.) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, the phrase "in communication," including variations thereof, encompasses direct communication and/ or indirect communication through one or more intermediary components, and does not require direct physical (e.g., wired) communication and/or constant communication, but rather additionally includes selective communication at periodic intervals, scheduled intervals, aperiodic intervals, and/ or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "forward" and "aft" refer to relative positions within a turbine engine or vehicle, and refer to the normal operational attitude of the turbine engine or vehicle. For example, with regard to a turbine engine, forward refers to a position closer to an engine inlet and aft refers to a position closer to an engine nozzle or exhaust.

As used herein, the terms "low," "mid" (or "mid-level"), and "high," or their respective comparative degrees (e.g., "lower" and "higher," when applicable), when used with compressor, turbine, shaft, fan, or turbine engine components, each refers to relative pressures, relative speeds, relative temperatures, and/or relative power outputs within an engine unless otherwise specified. For example, a "low power" setting defines the engine configured to operate at a power output lower than a "high power" setting of the engine, and a "mid-level power" setting defines the engine configured to operate at a power output higher than a "low power" setting and lower than a "high power" setting. The terms "low," "mid" (or "mid-level") or "high" in such terms may additionally, or alternatively, be understood as relative to minimum allowable speeds, pressures, or temperatures, or minimum or maximum allowable speeds, pressures, or temperatures relative to normal, desired, steady state, etc., operation of the engine.

As used herein, the terms "axial" and "axially" refer to directions and orientations that extend substantially parallel to a centerline of the turbine engine and/or a bearing assembly. Moreover, the terms "radial" and "radially" refer to directions and orientations that extend substantially perpendicular to the centerline (e.g., a rotational axis) of the turbine engine and/or the bearing assembly. In addition, as used herein, the terms "circumferential" and "circumferentially" refer to directions and orientations that extend accurately about the centerline of the turbine engine and/or the bearing assembly.

A centrifugal fluid pump moves fluid (e.g., fuel, water, oil, supercritical carbon dioxide ($sCO_2$), etc.) through systems (e.g., waste heat recovery (WHR) systems) by converting rotational kinetic energy of an impeller to hydrodynamic energy of the flowing fluid. In other words, the angular velocity of the impeller is directly proportional to the flow rate of the flowing fluid exiting the pump. The impeller receives a change in rotational kinetic energy from an electric motor applying mechanical work to an impeller shaft coupled to the impeller and to a rotor of an electric motor. The rotor receives a change in mechanical work over a period of time (e.g., mechanical power) from a stator in the electric motor applying electromagnetic forces to the rotor in the form of torque. When the motor supplies a constant amount of electrical energy to the stator, then the rotor supplies a constant amount of mechanical energy to the impeller.

During operation of the pump, spinning of an impeller shaft and the associated impeller can cause the impeller shaft to radially vibrate within a housing(s) of the pump. The pump housing(s) internally frame(s) radial bearings (e.g., hydrodynamic bearings, foil bearings, rolling-element bearings, etc.) to support radial loads (e.g., weight) of the impeller shaft and dampen the vibrations.

Also, during pump operations, the impeller shaft may experience axial loads that act generally parallel to the central axis of the pump and/or impeller shaft. Axial loads acting on the impeller can be unbalanced, meaning that a forward axial load (e.g., axial load acting toward a forward portion of the pump) and an aft axial load (e.g., axial load acting toward an aft portion of the pump) can be unequal and produce an axial thrust of the impeller shaft. A forward or an aft axial thrust can cause the impeller shaft to shift along the central axis and cause parts coupled to the impeller shaft (e.g., impeller, rotor shaft, motor armature, etc.) to contact the housing(s), the motor, and/or other internal parts of the pump. The pump housing(s) include(s) axial bearings (e.g., foil bearings) that support axial thrusts of the impeller shaft and reduce, inhibit, and/or dampen such movements.

In some examples, the fluid (e.g., $sCO_2$, oil, liquid helium, etc.) that the pump pressurizes in the system can be used to lubricate the radial and/or axial bearings to reduce frictional forces between a rotating element(s) within those bearings. For example, the pump can include flowlines leading from a pump outlet to the axial bearings to provide and/or transmit pressurized fluid to a thrust bearing. As used herein, a "flowline" can refer to a path (e.g., a flow path, flow direction, etc.) of the fluid and/or a structure (e.g., pipe, conduit, casing, etc.) used to enclose (e.g., direct, guide, convey, etc.) the fluid.

The pressurized fluid flows in between a thrust disc, a forward thrust pad, and an aft thrust pad of the thrust bearing apparatus, system, and/or assembly. The thrust disc is coupled to the impeller shaft and protrudes radially outward from the impeller shaft, and the thrust pads are coupled to the pump housing(s) and protrude radially inward toward the impeller shaft. Additionally, the fluid can flow between the impeller shaft and foil bearings positioned around the impeller shaft for radial support.

Furthermore, the pump can include expeller vanes to drive the fluid from internal portions of the pump housing to the pump outlet. In some examples, expeller vanes protrude from an aft side of the impeller and function similarly to impeller vanes. That is, fluid approaches the expeller vanes along the central axis and accelerates radially outward from the expeller vanes. Thus, the flowlines and the expeller vanes can implement a lubricating circuit from the pump outlet to the axial bearing(s) and back to the expeller vanes to provide a continuous flow of the fluid to the axial load bearings.

During operation of the pump, axial thrust of the impeller shaft can act in forward or aft directions based on interactions between the impeller vanes/expeller vanes and the fluid. The fluid enters through the pump inlet along a central/rotating/shaft axis toward the impeller, which includes the impeller vanes to accelerate the fluid radially outward into a pump outlet, chamber, flowline, casing, etc. Fluid pressure on a forward side, end portion, face, etc., of the impeller can transfer aft axial loads to the impeller shaft in the aft direction. Similarly, the fluid in the pump housing flows forward along the axis of rotation of the impeller shaft and builds up pressure on an aft side, end portion, face, etc. of the impeller (e.g., the expeller). Fluid pressure on an aft side of the impeller can transfer forward loads to the impeller shaft in the forward direction.

Unless otherwise noted, centrifugal pumps disclosed herein include at least one foil bearing (e.g., a hydrostatic gas foil bearing, a foil-air bearing, a fluid bearing, etc.) to support the axial and/or radial loads encountered by the impeller shaft and/or another rotating component in the pump, such as the impeller. Foil bearings include an inner foil lining (e.g., a top foil), a winding (e.g., a bump foil) positioned around the inner foil lining, and an outer foil lining (e.g., a bottom foil) and/or a housing positioned around the winding. During operation, the rotation of the component supported by the foil bearing produces a pressure that enables the fluid to move between the component and the foil bearing, which lifts the component. As such, the foil bearing supports the component and the fluid provides lubrication between the foil bearing and the component.

The foil bearing(s) is/are intended to operate with the fluid (e.g., carbon dioxide) in a supercritical and/or gaseous form/state. As used herein, the terms "form" and "state" are used interchangeably to refer to the phase of a fluid. However, at startup (e.g., when the operation of the pump is intended to begin), the temperature and/or the pressure of the fluid in the pump and/or the flowline can cause the fluid to be in a liquid state, which adversely affects the performance of the foil bearing(s). For example, the liquid can result in windage loss, a film thickness/stiffness, etc. that prevents or hinders lifting of the component within the foil bearing.

Examples disclosed herein provide a system to remove liquid from a pump to improve the operation of one or more foil bearing(s) and, in turn, the pump. In examples disclosed herein, the pump includes an impeller inlet, an impeller outlet, and an impeller that encounters fluid that flows through the impeller inlet and drives the fluid through the impeller outlet during pump operations. The pump also includes an impeller shaft and a motor positioned in a chamber. The pump includes one or more foil bearings to radially and/or axially support the impeller and/or the impeller shaft. The chamber includes a chamber inlet and a chamber outlet.

The system includes a first conduit including an end coupled to the pump at the pump inlet and a second conduit coupled to the pump at the pump outlet. The system also includes a third conduit including an end coupled to the chamber at the chamber inlet and a fourth conduit including an end coupled to the chamber at the chamber outlet. The system includes a fifth conduit fluidly coupled to a first portion of the third conduit upstream of the chamber inlet. A second portion of the third conduit includes the end coupled to the chamber at the chamber inlet. The second portion of the third conduit is fluidly coupled to the chamber during pre-pump start operations (e.g., before the motor of the pump drives a rotation of the impeller shaft and the impeller). The fifth conduit is also fluidly coupled to the fourth conduit downstream of the chamber outlet during the pre-pump start operations. The fifth conduit defines a flow path in which the fluid flows towards the impeller inlet.

The system includes a heat exchanger coupled to the third conduit upstream of the first portion of the third conduit to which the fifth conduit is coupled. In some examples, the system includes an eductor including a first inlet coupled to an end of (e.g., fluidly coupled to) the third conduit, a second inlet coupled to an end of (e.g., fluidly coupled to) the fourth conduit during the pre-pump start operations, and an outlet coupled to an end of (e.g., fluidly coupled to) the fifth conduit.

During pre-pump start operations, the eductor utilizes the venturi effect to generate suction at the second inlet, which pulls the fluid in the liquid state out of the pump chamber. Specifically, the eductor includes a nozzle (e.g., a converging section) at the first inlet, a suction chamber in fluid connection with the second inlet, and a diffuser at the outlet. The nozzle narrows a cross-sectional area of the flow of the fluid from the first inlet (e.g., a prime fluid, a motive fluid). The narrowed cross-sectional area increases the velocity and reduces the pressure of the fluid as a result of the conservation of mechanical energy. The nozzle extends at least partially through the suction chamber, and an outlet of the nozzle forms a flowline in a same direction of a flowline through the diffuser. After flowing through the nozzle outlet, the fluid encounters a larger cross-sectional that decreases the velocity and increases the pressure of the fluid. The increased pressure downstream of the nozzle outlet causes the suction chamber, which is upstream of the nozzle outlet, to form a region of low pressure in the eductor. As a result, the low pressure in the suction chamber is less than a pressure of the fluid in the fourth conduit. The pressure difference between the suction chamber and the fluid in the fourth conduit enables the suction chamber to form a vacuum that pulls the fluid from the fourth conduit through the second inlet of the eductor. Accordingly, the eductor pulls the fluid that is in the liquid state out of the pump chamber and into the eductor. The fluids from the first inlet and the second inlet mix in the diffuser section of the eductor before flowing through the eductor outlet and into the fifth conduit.

As a result of the heat exchanger transferring thermal energy to (e.g., heating) the fluid in the third conduit, the fluid at the first inlet of the eductor a first temperature. In some examples, the first temperature is greater than or equal to a temperature threshold (e.g., a critical point temperature of the fluid). Additionally, the heat exchanger increases a pressure of the fluid in the third conduit. A valve can be coupled to the third conduit and/or the heat exchanger at an outlet of the heat exchanger. The valve can be in a first position (e.g., a closed position) when the pressure of the fluid does not satisfy a pressure threshold (e.g., 100 bar) and/or when the temperature of the fluid does not satisfy a temperature threshold (e.g., a critical point temperature of the fluid, 87.8 degrees Fahrenheit ($°$ F.) for carbon dioxide ($CO_2$)) to maintain the fluid in the heat exchanger and cause the pressure and the temperature of the fluid to continue to increase. The valve can move to a second position (e.g., an open position) when the pressure of the fluid satisfies the pressure threshold and/or when the temperature of the fluid satisfies the temperature threshold to enable the fluid to flow towards the eductor and/or the pump chamber. In some examples, the valve is a spring-loaded valve. In such examples, a resistance of the spring that causes the valve to be biased towards the closed position is overcome when the pressure in the heat exchanger satisfies the pressure threshold. As a result, when the pressure of the fluid in the heat exchanger satisfies the pressure threshold, the fluid opens and flows past the valve. The valve can re-close when the pressure drops below the pressure threshold.

In some examples, the system includes an actively controllable valve in place of the spring-loaded valve. In such examples, the actively controllable valve is operatively coupled to programmable circuitry. In such examples, the programmable circuitry is in communication with a pressure sensor and/or a temperature sensor, which measure the pressure and/or the temperature of the fluid in the heat exchanger. The programmable circuitry can cause the actively controllable valve to maintain the fluid in the heat exchanger (e.g., cause the actively controllable valve to be in the closed position) when the pressure of the fluid in the heat exchanger does not satisfy the pressure threshold and/or when the temperature of the fluid in the heat exchanger does not satisfy the temperature threshold. Further, the programmable circuitry can cause the actively controllable valve to enable the fluid to flow past (e.g., cause the actively controllable valve to be in the open position) when the pressure of the fluid satisfies the pressure threshold and/or when the temperature of the fluid satisfies the temperature threshold. As a result, the heat exchanger and the valve cause the fluid that exits the heat exchanger and/or flows past the valve to have at least a first pressure (e.g., 100 bar) and/or at least a first temperature (e.g., 87.8° F.).

In some examples, the system includes a pressurization device operatively coupled to the third conduit downstream of the heat exchanger. In some examples, the pressurization device is implemented by a bellow-type device, spring-loaded device, and/or a SMA-type device. In such examples, the shape of the pressurization device is adjustable and can correspond with the pressure and/or the temperature of the fluid. In some examples, the pressurization device is implemented by an accumulator and/or a booster pump.

The fluid in the pump chamber and the fourth conduit includes a second pressure less than the first pressure (e.g., 50 bar) and a second temperature lower than the first temperature (e.g., less than 40° F.). The combination of the second pressure and the second temperature is such that the fluid in the pump chamber and the fourth conduit is in the liquid state. Because the eductor causes the fluids to mix, the mixed fluid has a third temperature between the first temperature and the second temperature as well as a third pressure between the first pressure and the second pressure. Accordingly, the thermal energy that the fluid from the third conduit received from the heat exchanger is shared with (e.g., partially transferred to) the fluid from the pump chamber and the fourth conduit.

In some examples, the system includes a liquid reservoir coupled to the fifth conduit downstream of the eductor. The liquid reservoir collects fluid that remains in the liquid state. For example, gravity can guide fluid that is flowing through the fifth conduit in a liquid state through a first supplementary conduit fluidly coupled to the liquid reservoir. In some examples, the liquid in the liquid reservoir receives thermal energy from the first heat exchanger. For example, the first heat exchanger can be a waste heat recovery heat exchanger associated with an exhaust section of a gas turbine, and the liquid reservoir can be coupled to, or positioned within a proximity of, the first heat exchanger while remaining separate from the third conduit. In some examples, the liquid in the liquid reservoir receives thermal energy from a second heat exchanger separate from the first heat exchanger. Further, when the temperature and/or pressure of the fluid satisfies a temperature and/or pressure threshold, the fluid can flow through another supplementary conduit that reintroduces the fluid into the fifth conduit. An end of the fifth conduit opposite the eductor is coupled to the first conduit, which directs the fluid to the impeller inlet of the pump. In some examples, one or more heat exchangers are coupled to the first conduit between the end of the fifth conduit and the impeller inlet.

The system includes sensors to measure the pressure and the temperature of the fluid. For example, the sensors can measure the pressure and the temperature of the fluid in the first conduit, in the second conduit, in the pump chamber, and/or in any other area of the system. The system also includes programmable circuitry communicatively coupled to the sensors. As such, the programmable circuitry can determine when the fluid is in a gaseous and/or supercritical state. Further, when the programmable circuitry determines the fluid is in the gaseous and/or supercritical state, the programmable circuitry can cause the pump to being operating.

The system also includes valves operatively coupled to the programmable circuitry. For example, the system can include a first valve coupled to the third conduit downstream of the first heat exchanger; a second valve coupled to the third conduit in a position that separates the first portion and the second portion of the third conduit; a third valve coupled to the fourth conduit upstream of the eductor; and/or a fourth valve coupled to the second conduit downstream of the pump outlet. The programmable circuitry controls respective positions of the valves based on a state of the fluid in the system, as discussed in further detail below.

For the figures disclosed herein, identical numerals indicate the same elements throughout the figures. Referring now to the drawings, FIG. 1 is a side view of an example aircraft 10. As shown in FIG. 1, the aircraft 10 includes a fuselage 12 and a pair of wings 14 (one is shown) extending outward from the fuselage 12. In the illustrated example, a gas turbine engine 100 is supported on each wing 14 to propel the aircraft through the air during flight. Additionally, the aircraft 10 includes a vertical stabilizer 16 and a pair of horizontal stabilizers 18 (one is shown). However, in some examples, the aircraft 10 includes engines of different types and/or in different positions than the illustrative example of FIG. 1.

Furthermore, the aircraft 10 can include a thermal management system 200 for transferring heat between fluids supporting the operation of the aircraft 10. More specifically, the aircraft 10 can include one or more accessory systems configured to support the operation of the aircraft 10. For example, such accessory systems include a lubrication system that lubricates components of the engines 100, a cooling system that provides cooling air to components of the engines 100, an environmental control system that provides cooled air to the cabin of the aircraft 10, and/or the like. In such examples, the thermal management system 200 is configured to transfer heat from one or more fluids supporting the operation of the aircraft 10 (e.g., the oil of the lubrication system, the air of the cooling system and/or the environmental control system, and/or the like) to one or more other fluids supporting the operation of the aircraft 10 (e.g., the fuel supplied to the engines 100). However, in some other examples, the thermal management system 200 is configured to transfer heat between another fluid or component supporting the operation of the aircraft 10.

Although examples disclosed herein are described with reference to the aircraft 10 of FIG. 1, examples disclosed herein can be applicable to another type or configuration of aircraft that uses a thermal management system substantially similar to the thermal management system 200 of FIGS. 1-3. Thus, the present subject matter can be readily adaptable to another aircraft and/or another heat transfer application associated with another type of vehicle.

Figure 2:
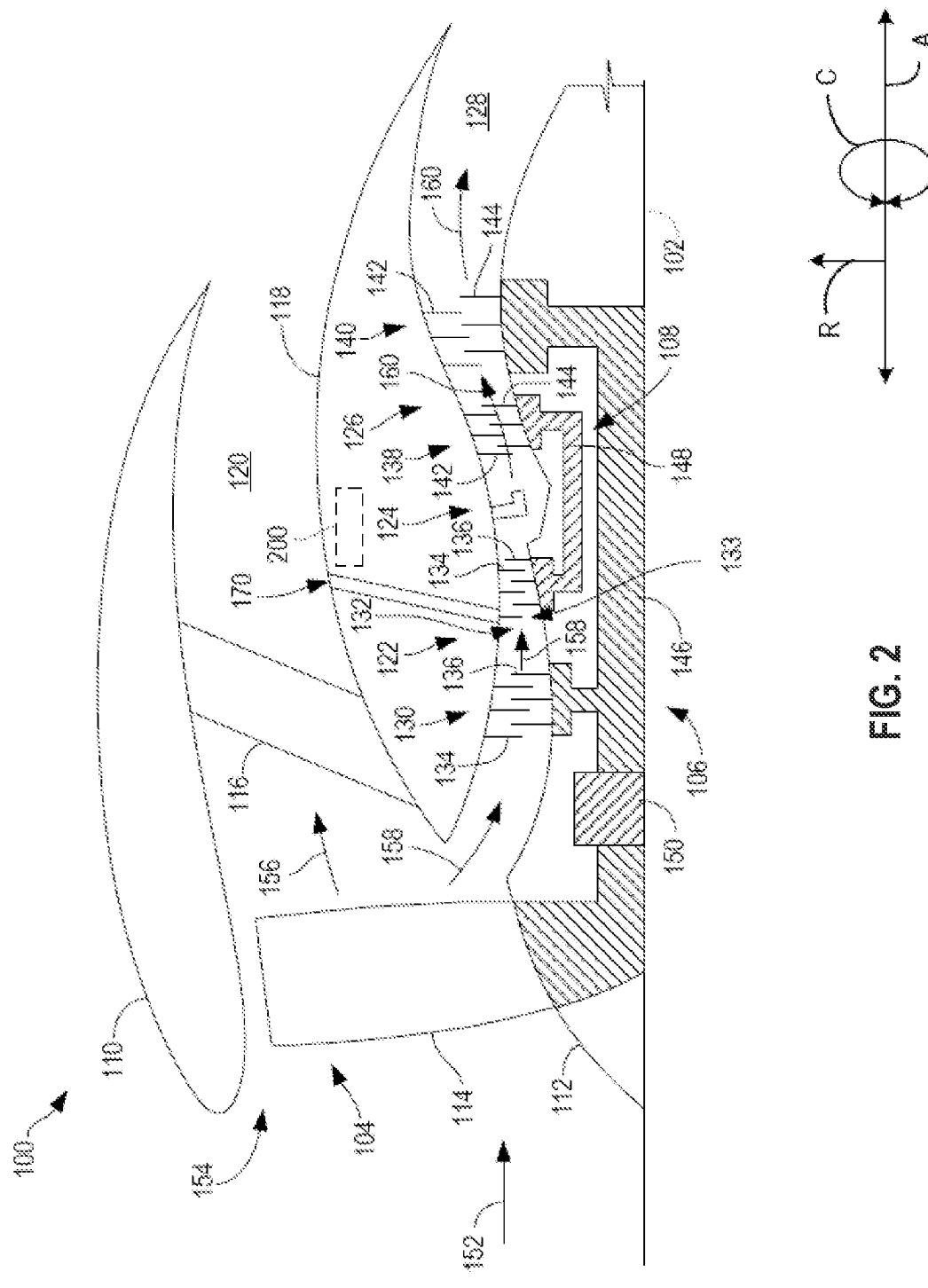
FIG. 2 is a schematic cross-sectional view of an example gas turbine engine of an aircraft.

FIG. 2 is a schematic cross-sectional view of an example gas turbine engine 100. In the illustrated example, the engine 100 is configured as a high-bypass turbofan engine. However, in some examples, the engine 100 is configured as a propfan engine, a turbojet engine, a turboprop engine, a turboshaft gas turbine engine, etc.

In general, the engine 100 extends along an axial centerline 102 and includes a fan 104, a low-pressure (LP) spool 106, and a high pressure (HP) spool 108 at least partially encased by an annular nacelle 110. More specifically, the fan 104 can include a fan rotor 112 and a plurality of fan blades 114 (one is shown) coupled to the fan rotor 112. In this respect, the fan blades 114 are circumferentially spaced apart and extend radially outward from the fan rotor 112. Moreover, the LP and HP spools 106, 108 are positioned downstream from the fan 104 along the axial centerline 102. As shown, the LP spool 106 is rotatably coupled to the fan rotor 112, which permits the LP spool 106 to rotate the fan blades 114. Additionally, a plurality of outlet guide vanes or struts 116 circumferentially spaced apart from each other and extend radially between an outer casing 118 surrounding the LP and HP spools 106, 108 and the nacelle 110. As such, the struts 116 support the nacelle 110 relative to the outer casing 118 such that the outer casing 118 and the nacelle 110 define a bypass airflow passage 120 positioned therebetween.

The outer casing 118 generally surrounds or encases, in serial flow order, a compressor section 122, a combustion section 124, a turbine section 126, and an exhaust section 128.

In some examples, the compressor section 122 includes a low-pressure (LP) compressor 130 of the LP spool 106 and a high-pressure (HP) compressor 132 of the HP spool 108 positioned downstream from the LP compressor 130 along the axial centerline 102. Each compressor 130, 132 can, in turn, include one or more rows of compressor stator vanes 134 interdigitated with one or more rows of compressor rotor blades 136. As such, the compressors 130, 132 define a compressed air flow path 133 extending therethrough.

Moreover, in some examples, the turbine section 126 includes a high-pressure (HP) turbine 138 of the HP spool 108 and a low-pressure (LP) turbine 140 of the LP spool 106 positioned downstream from the HP turbine 138 along the axial centerline 102. Each turbine 138, 140 can, in turn, include one or more rows of turbine stator vanes 142 interdigitated with one or more rows of turbine rotor blades 144.

Additionally, the LP spool 106 includes the low-pressure (LP) shaft 146 and the HP spool 108 includes a high-pressure (HP) shaft 148 positioned concentrically around the LP shaft 146. In such examples, the HP shaft 148 rotatably couples the turbine rotor blades 144 of the HP turbine 138 and the compressor rotor blades 136 of the HP compressor 132 such that rotation of the turbine rotor blades 144 of the HP turbine 138 rotatably drives the compressor rotor blades 136 of the HP compressor 132. As shown, the LP shaft 146 is directly coupled to the turbine rotor blades 144 of the LP turbine 140 and the compressor rotor blades 136 of the LP compressor 130. Furthermore, the LP shaft 146 is coupled to the fan 104 via a gearbox 150. In this respect, the rotation of the turbine rotor blades 144 of the LP turbine 140 rotatably drives the compressor rotor blades 136 of the LP compressor 130 and the fan blades 114.

In some examples, the engine 100 generates thrust to propel an aircraft. More specifically, during operation, air 152 enters an inlet portion 154 of the engine 100. The fan 104 supplies a first portion 156 of the air 152 to the bypass airflow passage 120 and a second portion 158 of the air 152 to the compressor section 122. The second portion 158 of the air 152 first flows through the LP compressor 130 in which the compressor rotor blades 136 therein progressively compress the second portion 158 of the air 152. Next, the second portion 158 of the air 152 flows through the HP compressor 132 in which the compressor rotor blades 136 therein continue to progressively compress the second portion 158 of the air 152. The compressed second portion 158 of the air 152 is subsequently delivered to the combustion section 124. In the combustion section 124, the second portion 158 of the air 152 mixes with fuel and burns to generate high-temperature and high-pressure combustion gases 160. Thereafter, the combustion gases 160 flow through the HP turbine 138 which the turbine rotor blades 144 of the HP turbine 138 extract a first portion of kinetic and/or thermal energy therefrom. This energy extraction rotates the HP shaft 148, which drives the HP compressor 132. The combustion gases 160 then flow through the LP turbine 140 in which the turbine rotor blades 144 of the LP turbine 140 extract a second portion of kinetic and/or thermal energy therefrom. This energy extraction rotates the LP shaft 146, which drives the LP compressor 130 and the fan 104 via the gearbox 150. The combustion gases 160 then exit the engine 100 through the exhaust section 128.

As mentioned above, the aircraft 10 can include a thermal management system 200 for transferring heat between fluids supporting the operation of the aircraft 10. In this respect, the thermal management system 200 can be positioned within the engine 100. For example, as shown in FIG. 2, the thermal management system 200 is positioned within the outer casing 118 of the engine 100. However, in some other examples, the thermal management system 200 is positioned at another location within the engine 100.

Furthermore, in some examples, the engine 100 defines a third-stream flow path 170. In general, the third-stream flow path 170 extends from the compressed air flow path 133 defined by the compressor section 122 to the bypass airflow passage 120. In this respect, the third-stream flow path 170 allows a portion of the second portion 158 of the air 152 from the compressor section 122 to bypass the combustion section 124. More specifically, in some examples, the third-stream flow path 170 defines a concentric or non-concentric passage relative to the compressed air flow path 133 downstream of one or more of the compressors 130, 132 or the fan 104. The third-stream flow path 170 can be configured to selectively remove the second portion 158 of the air 152 from the compressed air flow path 133 via one or more variable guide vanes, nozzles, or other actuatable flow control structures.

In addition, as will be described below, in some examples, the thermal management system 200 transfers heat to the air flowing through the third-stream flow path 170. However, a pressure and/or a flow rate of a fluid (e.g., a heat exchange fluid such as a supercritical fluid (e.g., supercritical carbon dioxide ($sCO_2$), etc.)) within the thermal management system 200 limits a rate at which thermal energy is transferred between the air and the heat exchange fluid. Additionally, it is advantageous for the thermal management system 200 to produce the pressure and/or the flow rate with pumps that support axial thrusts of the shaft within the pump to improve the lifespan and/or efficiency of the pump(s) and the thermal management system 200.

Although examples disclosed herein are described with reference to the gas turbine engine 100 of FIG. 2, examples disclosed herein can be applicable to another type or configuration of engine that uses a thermal management system substantially similar to the thermal management system 200 of FIGS. 1-3. Thus, the present subject matter can be readily adaptable to another engine, a gas turbine generator, and/or another heat transfer application associated with another type of vehicle.

Figure 3:
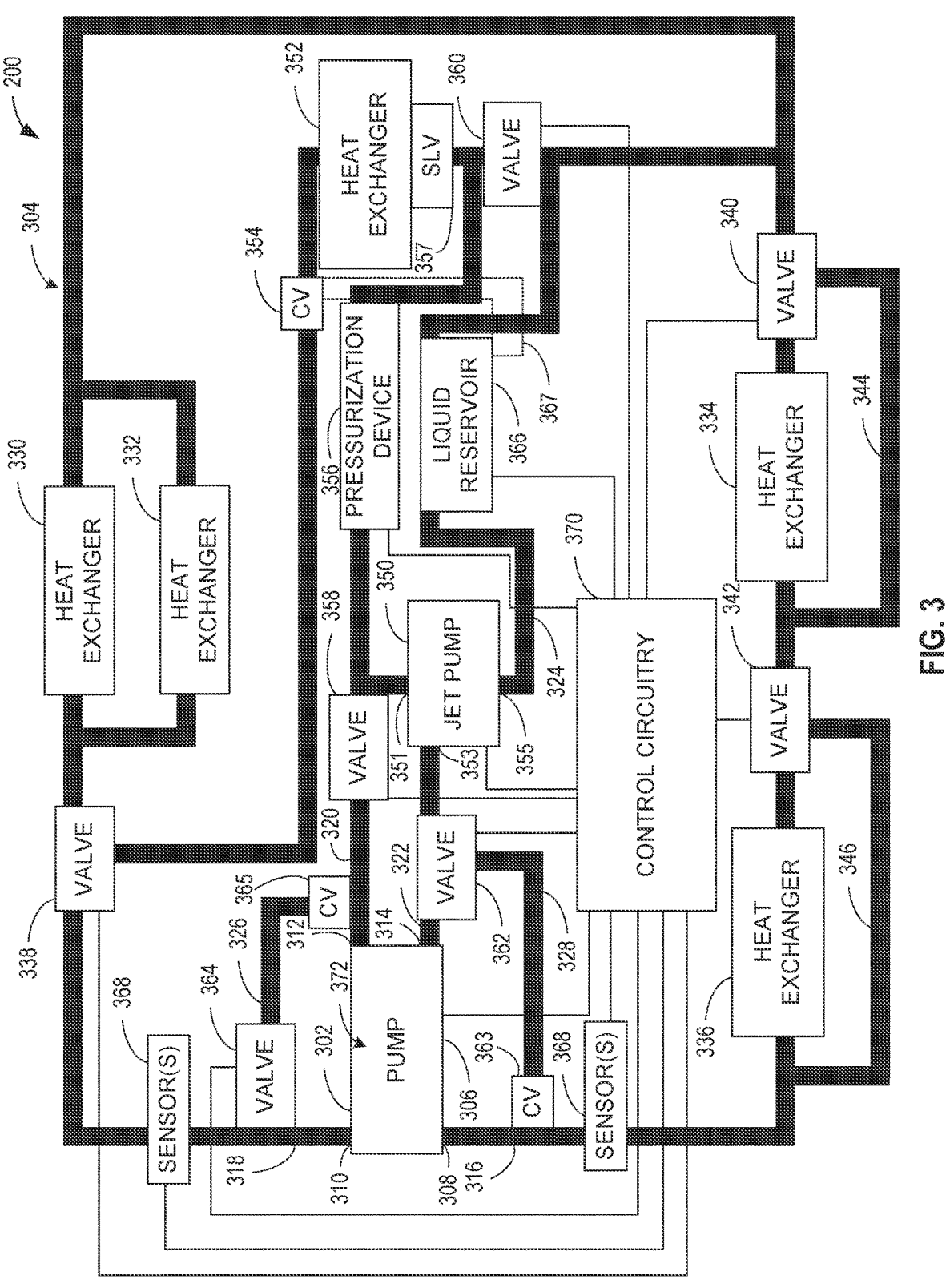
FIG. 3 is a schematic diagram of an example thermal management system for transferring heat between fluids in accordance with the teachings disclosed herein.

FIG. 3 is a schematic view of an example implementation of the thermal management system 200 for transferring heat between fluids (e.g., between a heat exchange fluid, such as gaseous or supercritical carbon dioxide ($sCO_2$), and one or more working fluids associated with the aircraft 10 of FIG. 1 and/or the gas turbine engine 100 of FIG. 2). The thermal management system 200 includes a pump 302 (e.g., a thermal transport bus pump, a centrifugal pump) and a closed-loop thermal transport bus 304 (e.g., interconnected conduits containing a thermal transport fluid). Advantageously, the thermal management system 200 causes the thermal transport fluid that is in a liquid state within the pump 302 and/or the thermal transport bus 304 to be converted to a gaseous and/or supercritical state in advance of pump operations (e.g., the pump 302 generating drive for the fluid in the thermal transport bus 304). In general, the thermal management system 200 is discussed in the context of the aircraft 10 and the gas turbine engine 100 described above and shown in FIGS. 1 and 2. However, the thermal management system 200 can be implemented within another type of aircraft and/or another gas turbine of another configuration.

In the illustrated example of FIG. 3, pump 302 includes a housing 306 (e.g., a motor housing, an impeller housing, a bearing housing, etc.), also referred to herein as a pump housing 306. The housing 306 includes a primary inlet 308 (e.g., an impeller inlet), a primary outlet 310 (e.g., an impeller outlet), a secondary inlet 312 (e.g., a chamber inlet), and a secondary outlet 314 (e.g., a chamber outlet). Accordingly, the housing 306 defines a chamber 372 that is fluidly coupled to the thermal transport bus 304. When the pump 302 is operating (e.g., during normal operations), a motor in the housing 306 drives rotation of a shaft that is coupled to an impeller. As a result, the impeller drives fluid that enters the primary inlet 308 through the primary outlet 310. The pump 302 includes one or more foil bearings in the housing 306 to support the motor, the shaft, and/or the impeller. An example implementation of the pump 302 is discussed in association with FIG. 6.

In the illustrated example of FIG. 3, the thermal transport bus 304 includes a first conduit 316 (e.g., a pump input conduit), a second conduit 318 (e.g., a pump output conduit), a third conduit 320, a fourth conduit 322, a fifth conduit 324, a sixth conduit 326, and a seventh conduit 328. Although the thermal transport bus 304 is described with reference to a certain number of interconnected conduits (e.g., pipes, tubes, etc.), it should be understood that any number of conduits can be used. Accordingly, one or more of the first conduit 316, the second conduit 318, the third conduit 320, the fourth conduit 322, the fifth conduit 324, the sixth conduit 326, and/or the seventh conduit 328 may be combined. Additionally or alternatively, the first conduit 316, the second conduit 318, the third conduit 320, the fourth conduit 322, the fifth conduit 324, the sixth conduit 326, and/or the seventh conduit 328 may be separable into more than one conduit.

In the illustrated example of FIG. 3, the first conduit 316 includes an end coupled to the pump 302 at the primary inlet 308. The second conduit 318 includes an end coupled to the pump 302 at the primary outlet 310. As such, the first conduit 316 and the second conduit 318 are directly fluidly coupled to (e.g., in direct fluid connection with) the impeller section of the pump 302. More particularly, the first conduit 316 and the second conduit 318 form a loop that enables the fluid from the pump 302 to be transported to a first heat exchanger 330, a second heat exchanger 332, a third heat exchanger 334, and/or a fourth heat exchanger 336 before returning the fluid to the pump 302. The thermal management system 200 includes a first valve 338, a second valve 340, and a third valve 342 operatively coupled to the first conduit 316 and/or the second conduit 318 to control whether and/or how much of the fluid flows through the heat exchangers 330, 332, 334, 336.

In some examples, one or more of the heat exchangers 330, 332, 334, 336 is configured as heat source heat exchanger(s) that cool a fluid supporting the operation of the aircraft 10 and/or the gas turbine engine 100 and, in turn, add heat to the heat exchange fluid in the thermal transport bus 304. In some examples, at least one of the heat exchangers 330, 332, 334, 336 is a heat exchanger(s) of the lubrication system(s) of the engine(s) 100. In such examples, the heat exchanger(s) 330, 332, 334, 336 transfers heat from the oil lubricating the engine(s) 100 to the heat transfer fluid. In some other examples, at least one of the heat exchanger(s) 330, 332, 334, 336 is a heat exchanger(s) of the cooling system of the engine(s) 100. In such examples, the heat exchanger(s) 330, 332, 334, 336 transfers heat from the cooling air bled from the compressor section(s) 122 (or a compressor discharge plenum) of the engine(s) 100 to the heat transfer fluid. However, in some other examples, the heat exchanger(s) 330, 332, 334, 336 corresponds to other types of heat exchangers that cool a fluid supporting the operation of the aircraft 10.

In some examples, one or more of the heat exchangers 330, 332, 334, 336 are configured as heat sink heat exchangers that transfer heat from the heat exchange fluid in the thermal transport bus 304 to other fluids supporting the operation of the aircraft 10 and/or the gas turbine engine 100. Thus, one or more of the heat exchangers 330, 332, 334, 336 may remove heat from the heat exchange fluid. For example, the heat exchanger(s) 330, 332, 334, 336 can be a heat exchanger(s) of the fuel system(s) of the engine(s) 100. In such examples, the fuel system heat exchanger(s) 330, 332, 334, 336 transfers heat from the heat exchange fluid to the fuel supplied to the engine(s) 100. In some other examples, at least one of the heat exchangers 330, 332, 334, 336 is a heat exchanger(s) in contact with the first portion 156 of the air 152 flowing through the bypass airflow passage(s) 120 of the engine(s) 100. In such examples, the heat exchanger(s) 330, 332, 334, 336 transfers heat from the heat exchange fluid to the first portion 156 of the air 152 flowing through the bypass airflow passage(s) 120 (see FIG. 2).

In some examples, one or more of the heat exchangers 330, 332, 334, 336 is configured to transfer heat to the air flowing through the third-stream flow path 170 (FIG. 2). In such examples, the heat exchanger(s) 330, 332, 334, 336 is in contact with the air flow through the third-stream flow path 170. Thus, heat from the heat exchange fluid flowing through the thermal transport bus 304 can be transferred to the air flow through the third-stream flow path 170. The use of the third-stream flow path 170 as a heat sink for the thermal management system 200 provides one or more technical advantages. For example, the third-stream flow path 170 provides greater cooling than other sources of bleed air because a larger volume of air flows through the third-stream flow path 170 than other bleed air flow paths. Moreover, the air flowing through third-stream flow path 170 is cooler than the air flowing through other bleed air flow paths and the compressor bleed air. Additionally, the air in the third-stream flow path 170 is pressurized, which allows the heat exchanger(s) 330, 332, 334, 336 to be smaller than heat exchangers relying on other heat sinks within the engine 100 (FIG. 2). Furthermore, in examples in which the engine 100 is unducted, using the third-stream flow path 170 as a heat sink does not increase drag on the engine 100 unlike the use of ambient air (e.g., a heat exchanger in contact with air flowing around the engine 100). However, in some other examples, the heat exchangers 330, 332, 334, 336 correspond to other types of heat exchangers that heat a fluid supporting the operation of the aircraft 10 (FIG. 1) and/or the gas turbine engine 100.

In some examples, the thermal management system 200 includes one or more bypass conduits 344, 346. Specifically, as shown, the bypass conduits 344, 346 are fluidly coupled to the first conduit 316 and/or the second conduit 318 such that the bypass conduits 344, 346 allow at least a portion of the heat exchange fluid to bypass one or more of the heat exchangers 334, 336. In some examples, the heat exchange fluid bypasses one or more of the heat exchangers 334, 336 to adjust the temperature of the heat exchange fluid within the thermal transport bus 304. In some examples, the flow of heat exchange fluid through the bypass conduit(s) 344, 346 is controlled to regulate the pressure of the heat exchange fluid within the thermal transport bus 304. Although the thermal management system 200 of the illustrated example includes two bypass conduits 344, 346, in some other examples, the thermal management system 200 includes another number of heat exchangers that have a corresponding bypass conduit(s) as long as there is at least one bypass conduit.

In the illustrated example of FIG. 3, the thermal management system 200 includes a jet pump 350. The jet pump 350 includes a first inlet 351 coupled to the third conduit 320; a second inlet 353 coupled to the fourth conduit 322; and an outlet 355 coupled to the fifth conduit 324. In some examples, the jet pump 350 is implemented as an eductor (e.g., a venturi jet pump). For example, when the jet pump 350 is an eductor, the jet pump 350 utilizes the venturi effect to generate suction at the second inlet 353, which pulls the fluid in the liquid state out of the housing 306. The example implementation of the jet pump 350 as an eductor is discussed further in association with FIG. 4. In some examples, the jet pump 350 is implemented as one or more other types of pump(s) that generate a pressure difference (e.g., suction) to pull fluid from the housing 306 through the fourth conduit 322 and towards the fifth conduit 324. For example, the jet pump 350 can be implemented as a scavenge pump, one or more positive displacement pumps (e.g., a gear pump(s), a reciprocating pump(s), a rotary vane pump(s), etc.), one or more centrifugal pumps that do not include foil bearings, a Shape Memory Alloy (SMA) based auto-actuation suction pump, a spring-energized pneumatic system, a piezoelectric suction pump, a piezoelectric-hydraulic suction pump (e.g., that utilizes a piezo stack actuator), an electromagnetic suction pump (e.g., a solenoid suction pump), etc. In some examples, the jet pump 350 is implemented as multiple venturis in series (e.g., a venturi vacuum generator).

In the illustrated example of FIG. 3, the thermal management system 200 includes a fifth heat exchanger 352 operatively coupled to the third conduit 320. For example, the fifth heat exchanger 352 can be a waste heat recovery (WHR) heat exchanger that causes the fluid in the third conduit 320 to absorb heat from the combustion gases 160 that exit the engine 100 through the exhaust section 128 of FIG. 2. However, in some other examples, the fifth heat exchanger 352 corresponds to another type of heat exchanger that transfers heat from another fluid (e.g., a fluid supporting the operation of the aircraft 10 and/or the gas turbine engine 100) to the fluid in the thermal transport bus 304. Additionally, the fifth heat exchanger 352 increases a pressure of the heat exchange fluid. Specifically, the heat transfers energy to molecules of the heat exchange fluid, which causes the molecules to move with increased velocity resulting in an increased pressure. The thermal transport system 200 also includes a first check valve 354 (referenced in FIG. 3 as "CV") (e.g., a valve that allows fluid to flow through it in only one direction, a valve that does not operate based on a control signal) operatively coupled to the third conduit 320 upstream of the fifth heat exchanger 352.

In the illustrated example of FIG. 3, the thermal management system includes a spring-loaded valve 357 (referenced in FIG. 3 as "SLV") (e.g., a valve that does not operate based on a control signal). The spring-loaded valve 357 can be coupled to an outlet of the fifth heat exchanger 352 and/or to the third conduit 320 proximate the outlet of the fifth heat exchanger 352. The spring-loaded valve 357 can be in a first position (e.g., a closed position) when the pressure of the fluid in the fifth heat exchanger 352 does not satisfy a pressure threshold (e.g., 100 bar) to maintain the fluid in the fifth heat exchanger 352 and, in turn, cause the pressure and the temperature of the fluid to continue to increase. The spring-loaded valve 357 moves to a second position (e.g., an open position) when the pressure of the fluid satisfies the pressure threshold to enable the fluid to exit the fifth heat exchanger 352. Additionally, the temperature of the fluid increases and satisfies a temperature threshold (e.g., a critical point temperature of the fluid, 87.8° F. for $CO_2$) when the pressure satisfies the pressure threshold. The spring-loaded valve 357 returns to the first position when the pressure of the fluid in the fifth heat exchanger 352 drops below the pressure threshold. In some examples, an actively-controlled valve is utilized in place of the spring-loaded valve 357.

In the illustrated example of FIG. 3, the thermal management system 200 includes a pressurization device 356 operatively coupled to the third conduit 320. The pressurization device 356 is positioned downstream of the fifth heat exchanger 352. The pressure ratio across the pressurization device 356 can be between 1 and 1.5. As such, the fluid in the third conduit 320 downstream of the pressurization device 356 can have a higher pressure than the fluid in the third conduit 320 upstream of the pressurization device 356. In some examples, the pressurization device 356 can be implemented by a bellows device. In such examples, a shape of the pressurization device 356 is adjustable (e.g., controllable) to control the pressure across the pressurization device 356. In some examples, the pressurization device 356 is implemented by a spring-loaded and/or SMA-type device. In such examples, the shape of the pressurization device 356 adjusts with the pressure and/or the temperature of the fluid. As such, the pressurization device can store energy during normal operations and cause energy to be delivered to the fluid during pre-start operations. In some examples, the pressurization device 356 can be implemented as an accumulator and/or a booster pump.

In the illustrated example of FIG. 3, the thermal management system 200 includes a fourth valve 358 (e.g., an actively controllable valve) operatively coupled to the third conduit 320. The fourth valve 358 is positioned downstream of the pressurization device 356. More particularly, the fourth valve 358 is positioned upstream of the secondary inlet 312 of the housing 306 and downstream of a portion of the third conduit 320 that includes an end coupled to the jet pump 350 at the first inlet 351. The fourth valve 358 is adjustable between a first position (e.g., an open position) and a second position (e.g., a closed position). For example, a control signal(s) can cause the fourth valve 358 to move between the first position and the second position. In the first position, the fourth valve 358 enables a portion of the fluid in the third conduit 320 to flow past the fourth valve 358 towards the housing 306. As such, when the fourth valve 358 is in the first position, a first portion of the fluid in the third conduit 320 flows towards the first inlet 351 of the jet pump 350 and a second portion (e.g., a remainder) of the fluid in the third conduit 320 flows towards the housing 306. In the second position, the fourth valve 358 blocks the fluid in the third conduit 320 from flowing past the fourth valve 358 towards the housing 306. As such, when the fourth valve 358 is in the second position, the fourth valve 358 causes all of the fluid in the third conduit 320 to flow towards the jet pump 350. In some examples, a position of the fourth valve 358 is modulated between the first position and the second position (e.g., configured to a partially open position) to control how much of the fluid in the third conduit 320 flows to the housing 306 and the jet pump 350.

In the illustrated example of FIG. 3, the thermal management system 200 includes a fifth valve 360 (e.g., an actively controlled valve) operatively coupled to the third conduit 320 and/or the fifth conduit 324. Specifically, the fifth valve 360 is positioned between (i) a fourth end of the third conduit 320 downstream of the fifth heat exchanger 352 and (ii) the fifth conduit 324. Accordingly, the third conduit 320 includes a first end (e.g., a first opening) coupled to the secondary inlet 312 of the pump 302; a second end (e.g., a second opening) coupled to the second conduit 318 at the first valve 338; a third end (e.g., a third opening) coupled to the jet pump 350; and a fourth end (e.g., a fourth opening) coupled to the fifth valve 360. The ends of the third conduit 320 can include openings to fluidly couple the third conduit to the pump housing 306, the second conduit 318, the jet pump 350, and the fifth conduit 324.

The fifth valve 360 is adjustable between a first position (e.g., a closed position) and a second position (e.g., an open position). For example, a control signal(s) can cause the fifth valve 360 to move between the first position and the second position. In the first position, the fifth valve 360 blocks the fluid in the third conduit 320 from flowing past the fifth valve 360 and into the fifth conduit 324. As such, when the fifth valve 360 is in the first position, all of the fluid in the third conduit 320 that exits the fifth heat exchanger 352 flows towards the pressurization device 356. In the second position, the fifth valve 360 enables a portion of the fluid in the third conduit 320 to flow into the fifth conduit 324. As such, when the fifth valve 360 is in the second position, a first portion of the fluid in the third conduit 320 that exits the fifth heat exchanger 352 flows past the fifth valve 360 into the fifth conduit 324 and a second portion (e.g., a remainder) of the fluid flows towards the pressurization device 356. In some examples, a position of the fifth valve 360 is modulated between the first position and the second position (e.g., to a partially open position) to control shares (e.g., portions, percentages, etc.) of the fluid in the third conduit 320 that flows to the fifth conduit 324 versus the pressurization device 356.

In the illustrated example of FIG. 3, the thermal management system 200 includes a sixth valve 362 (e.g., an actively controlled valve) operatively coupled to the fourth conduit 322 and/or the seventh conduit 328. Specifically, the fourth conduit 322 and the seventh conduit 328 include openings to enable the fourth conduit 322 and the seventh conduit 328 to be fluidly coupled. Accordingly, the fourth conduit 322 includes a first end coupled to the pump 302 at the secondary outlet 314 of the pump housing 306; a second end coupled to the jet pump 350 at the second inlet 353 of the jet pump; and an opening between the first end and the second end to enable a fluid connection between the fourth conduit 322 and the seventh conduit 328. The first and second ends of the fourth conduit 322 also include openings to fluidly couple the fourth conduit 322 to the pump housing 306 and the jet pump 350. Further, the seventh conduit 328 includes (i) a first end coupled to fourth conduit 322 and/or the sixth valve 362 and (ii) a second end coupled to the first conduit 316. The first end of the seventh conduit 328 includes an opening at the sixth valve 362 to enable a fluid connection between the fourth conduit 322 and the seventh conduit 328. Further, the first conduit 316 and the second end of the seventh conduit 328 include another opening to fluidly couple the seventh conduit 328 and the first conduit 316. In some examples, the thermal management system 200 includes a second check valve 363 at the second end of the seventh conduit 328 to enable fluid from the seventh conduit 328 to flow into the first conduit 316 while preventing fluid from the first conduit 316 from flowing into the seventh conduit 328.

In the illustrated example of FIG. 3, the sixth valve 362 is adjustable between a first position (e.g., a closed position for the seventh conduit 328, an open position for a downstream portion of the fourth conduit 322) and a second position (e.g., an open position for the seventh conduit 328, a closed position for the downstream portion of the fourth conduit 322) to control the fluid connection between the fourth conduit 322 and the seventh conduit 328. For example, a control signal(s) can cause the sixth valve 362 to move between the first position and the second position. In the first position, the sixth valve 362 causes the fluid that exits the housing 306 via the secondary outlet 314 to flow towards and enter the jet pump 350. Additionally, in the first position, the sixth valve 362 blocks the fluid that exits the housing 306 via the secondary outlet 314 from entering the seventh conduit 328. In the second position, the sixth valve 362 blocks the fluid that exits the housing 306 via the secondary outlet 314 from entering the jet pump 350 and causes the fluid to enter the seventh conduit 328. In some examples, a position of the sixth valve 362 is modulated between the first position and the second position to enable a first portion of the fluid that exits the housing 306 via the secondary outlet 314 to enter the jet pump 350 and enable a second portion (e.g., a remainder) of the fluid to enter the seventh conduit 328.

In the illustrated example of FIG. 3, the thermal management system 200 includes a seventh valve 364 (e.g., an actively controlled valve) operatively coupled to the second conduit 318 and/or the sixth conduit 326. Specifically, the second conduit 318 and the sixth conduit 326 include openings to enable the second conduit 318 and the sixth conduit 326 to be fluidly coupled. Accordingly, the sixth conduit 326 includes (i) a first end coupled to the seventh valve 364 and/or the second conduit 318 and (ii) a second end coupled to the third conduit 320. Further, the second conduit 318 and the third conduit 320 include openings to enable fluid connections with the sixth conduit 326. In some examples, the thermal management system 200 includes a third check valve 365 at the second end of the sixth conduit 326 to enable fluid from the sixth conduit 326 to flow into the third conduit 320 while preventing fluid from the third conduit 320 from flowing into the sixth conduit 326.

In the illustrated example of FIG. 3, the seventh valve 364 is adjustable between a first position (e.g., a closed position) and a second position (e.g., an open position). For example, a control signal(s) can cause the seventh valve 364 to move between the first position and the second position. In the first position, the seventh valve 364 blocks the fluid in the second conduit 318 from entering the sixth conduit 326. In the second position, the seventh valve 364 causes a portion of the fluid in the second conduit 318 to enter the sixth conduit 326. In some examples, a position of the seventh valve 364 is modulated to control an amount of the fluid in the second conduit 318 that flows into the sixth conduit 326.

In the illustrated example of FIG. 3, the thermal management system 200 includes a liquid reservoir 366 operatively coupled to the fifth conduit 324. The liquid reservoir 366 collects the fluid in the fifth conduit 324 that remains in the liquid state. For example, the liquid reservoir 366 can include a container and supplementary conduits fluidly coupled to the fifth conduit 324. In some examples, the fluid that is flowing through the fifth conduit 324 in a liquid state flows through a first supplementary conduit fluidly coupled to the container of the liquid reservoir 366. For example, gravity can cause the fluid that is in the liquid state to enter the supplementary conduit while allowing the fluid that is in the supercritical and/or gaseous state to continue flowing in the fifth conduit 324 past the liquid reservoir. In some examples, the liquid in the liquid reservoir 366 receives thermal energy from the fifth heat exchanger 352. For example, the liquid reservoir 366 can be positioned within a proximity of the fifth heat exchanger 352, or within a proximity of the exhaust section 128 of the engine 100 of FIG. 2, to enable the fluid in the liquid reservoir 366 to receive thermal energy. Alternatively, the liquid in the liquid reservoir 366 can receive thermal energy from a different heat exchanger. In some examples, the liquid reservoir 366 includes an in-built electrical heater that heats the fluid. As the temperature of the fluid in the liquid reservoir 366 increases, so does the pressure of the fluid. Further, when the temperature and/or pressure of the fluid in the liquid reservoir 366 satisfies a temperature and/or pressure threshold, the fluid can flow through a second supplementary conduit that reintroduces the fluid into the fifth conduit 324. For example, gravity can cause the liquid in the container of the liquid reservoir 366 to remain in the container. Further, the increased pressure in the container from the heat received (e.g., from the fifth heat exchanger 352, from the exhaust section 128, from another heat exchanger) causes the gaseous and/or supercritical fluid in the container to flow through the second supplementary conduit and exit the liquid reservoir 366. In some examples, the liquid reservoir 366 includes one or more check valves operatively coupled to an inlet of the first supplementary conduit and/or an inlet of the second supplementary conduit. In such examples, the check valves prevent gaseous and/or supercritical fluid from entering the liquid reservoir 366 (e.g., via the first supplementary conduit) and prevent liquid from exiting the liquid reservoir 366 (e.g., via the second supplementary conduit).

In some examples, the liquid reservoir 366 includes an outlet at a bottom portion of the container. In such examples, a supplementary conduit 367 is coupled to the container of the liquid reservoir 366 at the outlet and to the third conduit 320 at the first check valve 354. Accordingly, the supplementary conduit 367 can transport cooler fluid from the liquid reservoir 366 to the fifth heat exchanger 352. The first check valve 354 prevents the fluid in the third conduit 320 from entering the supplementary conduit 367 but allows the fluid in the liquid state to flow into the third conduit 320 and, in turn, the fifth heat exchanger 352. As such, the supplementary conduit 367 provides a flowline for a continuous motion of the fluid in the liquid state from the bottom of the liquid reservoir 366 to the inlet of the fifth heat exchanger 352.

In the illustrated example of FIG. 3, the thermal management system 200 includes one or more sensor(s) 368 operatively coupled to the pump 302 and/or the thermal transport bus 304. Specifically, the sensor(s) 368 measure the temperature and the pressure of the fluid in the pump 302 and/or the thermal transport bus 304. Although the illustrated example of FIG. 3 shows two of the sensor(s) 368 operatively coupled to the first conduit 316 and the second conduit 318, it should be appreciated that the thermal management system 200 can include any number of the sensor(s) 368 in alterative locations to measure the temperature and the pressure of the fluid in the thermal management system 200.

In the illustrated example of FIG. 3, the thermal management system 200 includes control circuitry 370 to control operations of the pump 302 and the valves 338, 340, 342, 358, 360, 362, 364 based on operations of the pump 302, the pressure in the thermal transport bus 304, and/or the temperature of the heat exchange fluid within the thermal transport bus 304. The control circuitry 370 of FIG. 3 may be instantiated (e.g., creating an instance of, bring into being for any length of time, materialize, implement, etc.) by programmable circuitry such as a Central Processor Unit (CPU) executing first instructions. Additionally or alternatively, the control circuitry 370 of FIG. 3 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 3 may, thus, be instantiated at the same or different times. Some or all of the circuitry of FIG. 3 may be instantiated, for example, in one or more threads executing concurrently on hardware and/or in series on hardware. Moreover, in some examples, some or all of the circuitry of FIG. 3 may be implemented by microprocessor circuitry executing instructions and/or FPGA circuitry performing operations to implement one or more virtual machines and/or containers. In some examples, the control circuitry 370 is instantiated by programmable circuitry executing control instructions and/or configured to perform operations such as those represented by the flowchart of FIG. 6.

In the illustrated example of FIG. 3, the control circuitry 370 is communicatively coupled to the pump 302 (e.g., a motor of the pump 302), the actively controlled valves 338, 340, 342, 358, 360, 362, 364, and/or the sensor(s) 368. In some examples, the control circuitry 370 is also communicatively coupled to the jet pump 350 and/or the pressurization device 356. For example, the control circuitry 370 can be communicatively coupled to the jet pump 350 when the jet pump 350 is implemented as one or more actively controlled pumps (e.g., one or more scavenge pumps, one or more positive displacement pumps, one or more centrifugal pumps that do not include foil bearings) that operate based on an input signal. As such, the control circuitry 370 is not communicatively coupled to the jet pump 350 when the jet pump 350 is implemented as an eductor or a venturi vacuum generator, which drive movement of the fluid without moving parts, as discussed further in connection with FIG. 4.

In the illustrated example of FIG. 3, the control circuitry 370 controls the valves 358, 360, 362, 364 and/or the jet pump 350 based on a state of the fluid in the thermal transport bus 304 and/or the pump 302. More particularly, to determine the state of the fluid and, thus, an operational status of the thermal management system 200, the control circuitry 370 accesses the temperature and the pressure of the fluid measured by the sensor(s) 368. Further, the control circuitry 370 compares the temperature and the pressure to one or more thresholds. For example, the control circuitry 370 can compare the pressure to a first pressure threshold, a second pressure threshold, a first temperature threshold, and/or a second temperature threshold. The first pressure threshold can be defined by a critical point pressure of the fluid in the thermal management system 200 (e.g., 73.8 bar for $CO_2$). The first temperature threshold can correspond to a triple point temperature of the fluid in the thermal management system (e.g., −69.88° F. for $CO_2$). The second pressure threshold can correspond to a triple point pressure of the fluid in the thermal management system 200 (e.g., 5.18 bar for $CO_2$). The second temperature threshold can correspond to a critical point temperature of the fluid in the thermal management system 200 (e.g., 87.8° F. for $CO_2$). In some examples, the second temperature threshold is less than the critical point temperature of the fluid when the thermal management system 200 is operable with the fluid in the gaseous state. In such examples, the control circuitry 370 can set the second temperature threshold based on the pressure of the fluid to ensure the fluid is in a gaseous state and not a liquid state. Similarly, in some examples, the first pressure threshold is less than the critical point pressure of the fluid when the thermal management system 200 is operable with the fluid in the gaseous state. In such examples, the first pressure threshold is closer to the critical point pressure than to the triple point pressure.

When the pressure satisfies (e.g., is less than or equal to, is less than) the first pressure threshold and the temperature does not satisfy (e.g., is less than or equal to, is less than) the first temperature threshold, the control circuitry 370 determines that there is a solid formation (e.g., dry ice) in the pump 302 and/or the thermal transport bus 304 and prevents and/or delays operation of the thermal management system 200. For example, the control circuitry 370 can delay an activation of the pump 302 and/or other components in the thermal management system 200 until the temperature satisfies the first temperature threshold. In some examples, the control circuitry 370 causes an alert to be transmitted to an operator associated with the thermal management system 200 in response to detecting the solid formation. In some examples, in response to the pressure not satisfying the first pressure threshold and the temperature not satisfying the first temperature threshold, the control circuitry 370 causes the sixth valve 362 to be in the associated second position (e.g., the open position for the seventh conduit 328, the closed position for the downstream portion of the fourth conduit 322) to prevent the jet pump 350 from pulling in fluid from the fourth conduit 322 and, thus, prevent movement of the fluid in the thermal transport bus 304. In some examples, the control circuitry 370 waits a predetermined period before re-analyzing the pressure and/or the temperature to determine whether the solid has been converted to a liquid state.

When the temperature satisfies (e.g., is greater than, is greater than or equal to) the first temperature threshold and the pressure does not satisfy (e.g., is less than or equal to, is less than) the first pressure threshold nor the second pressure threshold, the control circuitry 370 determines that there is leakage in the thermal management system 200. In some examples, the control circuitry 370 causes an alert to be transmitted to an operator associated with the thermal management system in response to detecting the leakage.

When the temperature satisfies the first temperature threshold and the pressure is between the first pressure threshold and the second pressure threshold, the control circuitry 370 determines that at least a portion of the fluid in the thermal management system 200 is in a sub-critical state. As used herein, a "sub-critical state" of the fluid is a state in which the temperature and/or the pressure of the fluid is less than the associated critical point temperature and/or critical point pressure. As a result, the control circuitry 370 causes pre-start operations to be performed before the pump 302 begins operating (e.g., before the motor drives a rotation of the impeller of the pump 302, before power is delivered to the motor of the pump 302) to cause the fluid to reach the supercritical and/or gaseous state. Similarly, when the pressure satisfies the first pressure threshold and the temperature does not satisfy (e.g., is less than or equal to, is less than) the second temperature threshold, the control circuitry 370 determines that at least a portion of the fluid in the thermal management system 200 is in the sub-critical state and causes the pre-start operations to be performed.

During the pre-start operations, the control circuitry 370 causes the fourth valve 358 to be in the associated first position (e.g., the open position); the control circuitry 370 causes the fifth valve 360 to be in the associated first position (e.g., the closed position); the control circuitry 370 causes the sixth valve 362 to be in the associated first position (e.g., the closed position for the seventh conduit 328, the open position for a downstream portion of the fourth conduit 322); and the control circuitry 370 causes the seventh valve 364 to be in the associated first position (e.g., the closed position). Additionally, the control circuitry 370 can cause the first valve 338 to be in a position in which at least a portion of the fluid in the second conduit 318 flows into the third conduit 320. For example, the control circuitry 370 can transmit control signals to the valves 338, 358, 360, 362, 364 to cause the valves 338, 358, 360, 362, 364 to move to the associated first positions for the pre-start operations.

As a result, during the pre-start operations, the fifth heat exchanger 352 and/or the pressurization device 356 increase the pressure and/or the temperature of the fluid in the third conduit 320. In some examples, the fifth heat exchanger 352 and/or the pressurization device 356 heat the fluid to a gaseous state and/or a supercritical state. Further, a first portion of the fluid in the third conduit 320 flows into the jet pump 350 and a second portion of the fluid in the third conduit 320 flows through the secondary inlet 312 of the pump 302. As such, heated fluid is induced into the housing 306 and pushes cooler and/or lower pressure fluid through the secondary outlet 314. The pressure differential formed by the jet pump 350 also pulls cooler and/or lower pressure fluid out of the housing 306 and through the fourth conduit 322. Accordingly, the cooler and/or lower pressure fluid in the housing 306 is replaced with warmer and/or higher pressure fluid. More particularly, fluid in the housing 306 that is in the liquid state is replaced with fluid in the gaseous and/or supercritical state. As a result, when the liquid is removed from the housing 306, foil bearings in the pump 302 can operate without encountering windage loss, an increased film thickness/stiffness, etc. that would otherwise result from operating with liquid in the housing 306 and adversely affect the functionality of the pump 302.

Furthermore, the jet pump 350 outputs a mixture of the warmer, higher pressure fluid from the third conduit 320 and the cooler, lower pressure fluid from the fourth conduit 322 into the fifth conduit 324. As a result, the fluids mix, and the temperature and/or the pressure of the fluid from the fourth conduit 322 increase. The liquid reservoir 366 downstream of the jet pump 350 collects the fluid in the fifth conduit 324 that remains in the liquid state and enables the temperature and/or the pressure of the fluid to increase before re-entering the flowline in the fifth conduit 324. The fifth conduit 324 carries (e.g., conveys, transports, etc.) the fluid to the first conduit 316. Accordingly, the fluid can circulate through the thermal transport bus 304 while the fifth heat exchanger 352, the pressurization device 356, the jet pump 350, and/or the liquid reservoir 366 help heat, pressurize, and move the fluid to convert the fluid in the thermal management system 200 that is in the liquid state to a gaseous and/or supercritical state. In some examples, the control circuitry 370 causes the thermal management system 200 to perform the pre-start operations for a predetermined period of time (e.g., 20 seconds, 1 minute, 2 minutes, etc.). In some examples, the control circuitry 370 determines the predetermined period of time based on the measured pressure and/or temperature of the fluid. For example, the control circuitry 370 can cause the thermal management system 200 to perform the pre-start operations for a first period of time when the fluid has a first pressure and/or a first temperature, and the control circuitry 370 can cause the thermal management system 200 to perform the pre-start operations for a second period of time greater than the first period of time when the fluid has a second pressure less than the first pressure and/or a second temperature less than the first temperature. In some examples, the control circuitry 370 determines a duration for which the pre-start operations are to be performed based on an amount of liquid in the liquid reservoir. For example, the liquid reservoir 366 can include one or more sensors, such as a liquid level sensor, a pressure sensor, a temperature sensor, and/or the like to identify an amount of liquid in the liquid reservoir. In some examples, the control circuitry 370 causes the operations to switch from the pre-start operations to the normal operations when the liquid in the liquid reservoir 366 satisfies (e.g., is less than, is less than or equal to) a liquid threshold (e.g., no liquid or a nominal amount of liquid, such as 1-2 milliliters (mLs)). In some examples, the control circuitry 370 monitors the temperature and/or the pressure of the fluid and causes the thermal management system 200 to switch from the pre-start operations to normal operations when the pressure satisfies (e.g., is greater than, is greater than or equal to) the first pressure threshold and the temperature satisfies (e.g., is greater than, is greater than or equal to) the second temperature threshold.

In the illustrated example of FIG. 3, the control circuitry 370 determines the fluid in the thermal management system 200 is in the supercritical state when the pressure satisfies the first pressure threshold and the temperature satisfies the second temperature threshold. When the fluid in the thermal management system 200 is in the supercritical state, the control circuitry 370 causes the thermal management system 200 to begin normal operations. In some examples, there is overlap between the pre-start operations and some of the normal operations. In such examples, the control circuitry 370 causes the pump 302 to begin operating (e.g., transmits a drive signal to a motor of the pump 302) while the jet pump 350 continues to pull fluid out of the housing 306 of the pump 302. To begin the normal operations, the control circuitry 370 causes: (i) the fourth valve 358 to move to, or remain in, the associated second position (e.g., the closed position); (ii) the fifth valve 360 to move to, or remain in, the associated second position (e.g., the open position); (iii) the sixth valve 362 to move to, or remain in, the associated second position (e.g., the open position for the seventh conduit 328, the closed position for the downstream portion of the fourth conduit 322); and the seventh valve 364 to move to, or remain in, the associated second position (e.g., the open position). Further, the control circuitry 370 causes the pump 302 to drive the fluid through the thermal transport bus 304. For example, the control circuitry 370 can transmit control signals to the valves 358, 360, 362, 364 to cause the valves 358, 360, 362, 364 to move to the associated second positions. Further, the control circuitry 370 can transmit a control signal to a motor of the pump 302 to cause the impeller of the pump 302 to rotate and drive the fluid through the thermal transport bus 304.

In the illustrated example of FIG. 3, during the normal operations, the fourth valve 358 blocks the fluid in the third conduit 320 from flowing past and, thus, causes all of the fluid in the third conduit 320 between the fourth valve 358 and the pressurization device 356 to flow through the jet pump 350. In some examples, when the jet pump 350 is implemented as an actively controllable pump, the control circuitry 370 causes the fluid in the third conduit 320 to bypass the jet pump 350. In such examples, the thermal management system 200 can include another actively controllable valve operatively coupled to the third conduit 320 between the pressurization device and the jet pump 350. In such examples, the thermal management system 200 includes another bypass conduit including a first end coupled to the third conduit 320 at the valve and a second end coupled to the fifth conduit 324 at a check valve that prevents fluid in the fifth conduit 324 from entering the bypass conduit. In such examples, the control circuitry 370 can adjust the position of the valve to cause the fluid in the third conduit 320 to bypass the jet pump 350 during the normal operations. The fifth valve 360 allows a portion of the fluid in the third conduit downstream of the fifth heat exchanger 352 to enter the fifth conduit 324. The sixth valve 362 blocks the fluid in the fourth conduit 322 from reaching the second inlet 353 of the jet pump 350. Accordingly, the sixth valve 362 prevents a pressure differential formed by the jet pump 350 from directing movement of the fluid in the pump housing 306 and, instead, allows the impeller of the pump 302 to drive the fluid to the heat exchangers 330, 332, 334, 336, 352 for operational support of the aircraft 10 and/or the gas turbine engine 100. Additionally, the seventh valve 364 enables a portion of the fluid in the second conduit 318 to enter the sixth conduit 326 and, in turn, a portion of the third conduit 320 between the fourth valve 358 and the secondary inlet 312. As a result, the fluid can enter the pump housing 306. Moreover, the sixth valve 362 enables the seventh conduit 328 to recirculate the fluid that exits the pump housing 306 via the secondary outlet 314 to the first conduit 316. As such, the flowlines formed by the sixth valve 362 and the seventh valve 364 enable a circulation of the fluid in the pump housing 306, which can provide lubrication between the foil bearings and the shaft of the pump 302.

Furthermore, during normal operations, the fluid can exchange thermal energy with fluids supporting the operations of the aircraft 10 of FIG. 1 and/or the gas turbine engine 100 of FIG. 2. In some examples, the control circuitry 370 controls respective positions of the first, second, and third valves 338, 340, 342 based on the temperature and/or the pressure of the heat exchange fluid in the thermal management system 200 and/or the temperature and/or the pressure of the working fluid of the aircraft 10 and/or the gas turbine engine 100.

For example, in some instances, the pressure of the heat exchange fluid flowing through the thermal transport bus 304 can fall outside of a desired pressure range. When the pressure of the heat exchange fluid is too high, the thermal management system 200 can incur accelerated wear. In this respect, when the pressure of the heat exchange fluid within the thermal transport bus 304 exceeds a maximum or otherwise increased pressure value, the control circuitry 370 adjusts a position of one or more of the valves 338, 340, 342. For example, the control circuitry 370 can cause at least a portion of the heat exchange fluid to flow through the bypass conduits 344, 346 instead of the heat exchanger(s) 334, 336 when the heat exchanger(s) 334, 336 are heat source heat exchangers. Thus, less heat is added to the heat exchange fluid by the heat source heat exchanger(s) 334, 336, which reduces the temperature and, thus, the pressure of the fluid. In some examples, the maximum pressure value is between 3800 and 4000 pounds per square inch or less. In some examples, the maximum pressure value is between 2700 and 2900 pounds per square inch, such as 2800 pounds per square inch. In some other examples, the maximum pressure value is between 1300 and 1500 pounds per square inch, such as 1400 pounds per square inch. Such maximum pressure values generally prevent the thermal management system 200 from incurring accelerated wear.

In some examples, the maximum pressure value is set prior to and/or during operation based on one or more parameters (e.g., materials utilized, a design of the pump 302, a design of the aircraft 10, a design of the gas turbine engine 100, properties of the heat exchange fluid, etc.) associated with the thermal management system 200. The example maximum pressure value can be adjusted relative to the pressure capacities of the thermal transport bus 304, the pump 302, the heat exchangers 330, 332, 334, 336, 352, the conduits 316, 318, 320, 322, 324, 326, 328, 344, 346, the check valves 354, 363, 365, and/or the actively controlled valves 338, 340, 342, 358, 360, 362, 364.

Conversely, when the pressure of the heat exchange fluid is too low, the pump 302 can experience operability problems and increased wear. As such, when the pressure of the heat exchange fluid within the thermal transport bus falls below a minimum or otherwise reduced pressure value, the control circuitry 370 adjusts a position of one or more of the valves 338, 340, 342. For example, the control circuitry 370 can adjust a position of the second valve 340 and/or the third valve 342 to cause at least a portion of the heat exchange fluid to flow through the bypass conduits 344, 346 instead of the heat exchanger(s) 334, 336 when the heat exchanger(s) 334, 336 are heat sink heat exchangers. Thus, less heat is removed from the heat exchange fluid by the heat exchanger(s) 334, 336, which increases the temperature and, thus, the pressure of the fluid. In some examples, the minimum pressure value is 1070 pounds per square inch or more. In some examples, the minimum pressure value is between 1150 and 1350 pounds per square inch, such as 1250 pounds per square inch. In some other examples, the minimum pressure value is between 2400 and 2600 pounds per square inch, such as 2500 pounds per square inch. Such minimum pressure values are generally utilized when the heat exchange fluid is in a supercritical state (e.g., when the heat exchange fluid is carbon dioxide).

As such, the thermal management system 200 can be configured to operate such that the pressure of the heat transport fluid is maintained within a range extending between the minimum and maximum pressure values. In some examples, the range extends from 1070 to 4000 pounds per square inch. Specifically, in one example, the range extends from 1250 to 1400 pounds per square inch. In some other examples, the range extends from 2500 to 2800 pounds per square inch. Accordingly, the control circuitry 370 helps the thermal management system 200 maintain the pressure of the heat exchange fluid within the thermal transport bus 304 within a specified range of values as the thermal load placed on the thermal management system 200 varies.

Figure 4:
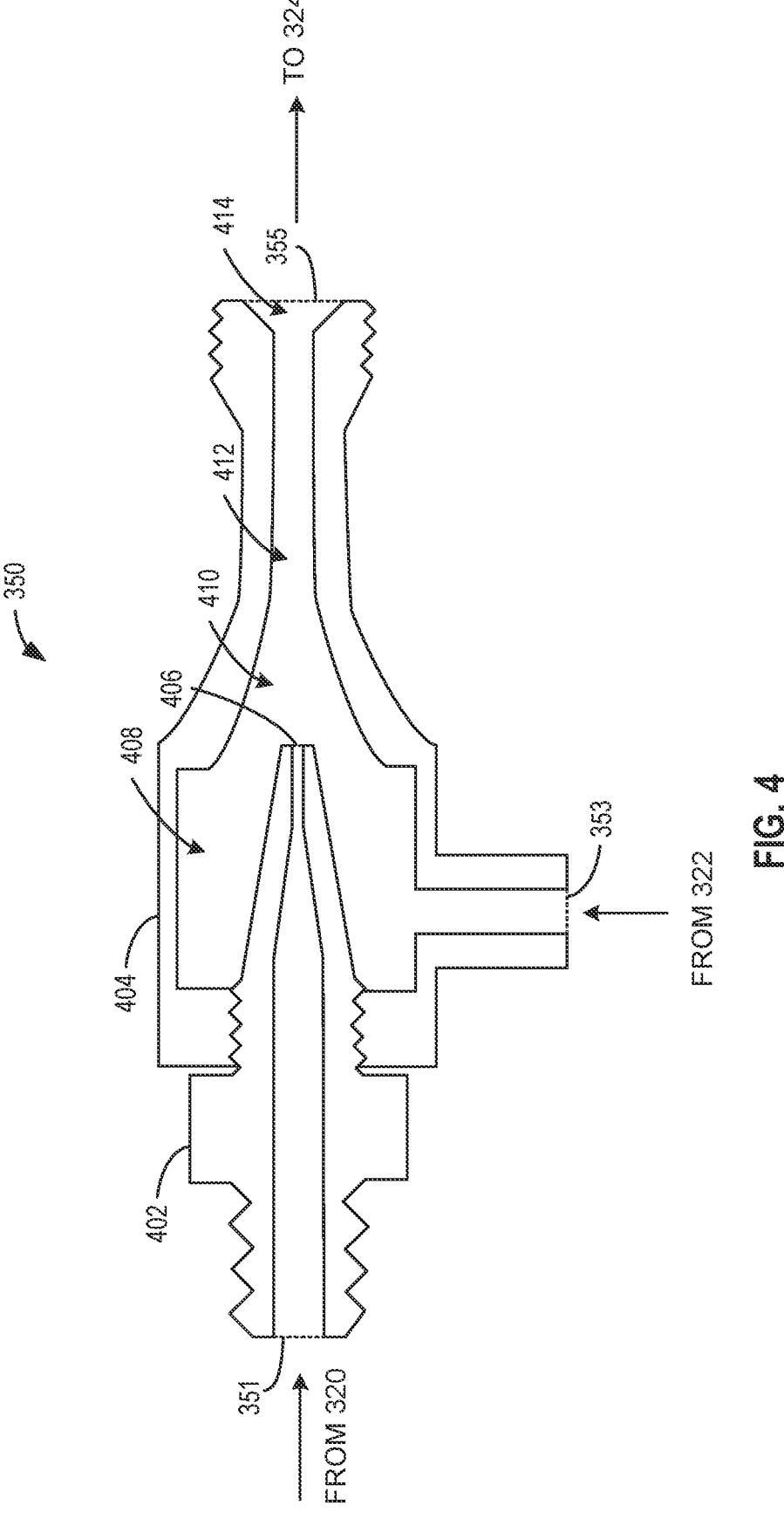
FIG. 4 is a schematic illustration of an example jet pump of the example thermal management system of FIG. 3

FIG. 4 is a schematic illustration of an example implementation of the jet pump 350 of FIG. 3. In the illustrated example of FIG. 4, the jet pump 350 is implemented as an eductor. The jet pump 350 includes the first inlet 351, the second inlet 353, and the outlet 355 of FIG. 3. The jet pump 350 also includes a nozzle 402 (e.g., a converging nozzle) and a body 404 coupled to the nozzle 402. The nozzle 402 defines the first inlet 351 and a nozzle outlet 406. Thus, the nozzle 402 receives hotter and/or higher pressure fluid from the third conduit 320 (FIG. 3). The body 404 defines the second inlet 353 in fluid connection with the fourth conduit 322 (FIG. 3), a suction chamber 408 (e.g., a suction area, a suction section), a mixing section 410 (e.g., a mixing chamber, a mixing area), a throat 412, a diffuser 414, and the outlet 355 in fluid connection with the fifth conduit 324 (FIG. 3).

In the illustrated example of FIG. 4, the nozzle 402 constricts (e.g., narrows) a cross-sectional area of a defined flowline towards the outlet 355. As a result, the constricted cross-sectional area increases the velocity and reduces the pressure of the fluid flowing through the nozzle 402. The nozzle 402 extends through the suction chamber 408 and outputs the heated, high pressure fluid into the mixing section 410. After flowing through the nozzle outlet 406, the fluid encounters a larger cross-sectional area in the body 404. The larger cross-sectional area decreases the velocity and increases the pressure of the fluid that exits the nozzle 402. The increased pressure downstream of the nozzle outlet 406 causes the suction chamber 408 to form a region of low pressure in the jet pump 350. More particularly, the low pressure is less than a pressure in the pump housing 306 and/or the fourth conduit 322. As a result, the pressure difference between (i) the suction chamber 408 and (ii) the pump housing 306 (FIG. 3) and/or the fourth conduit 322 forms a vacuum that pulls colder, lower pressure fluid (e.g., fluid in the liquid state) out of the housing 306 of the pump 302 (FIG. 3), through the fourth conduit 322, and through the second inlet 353 of the jet pump 350.

Further, the hotter, higher pressure fluid from the third conduit 320 mixes with the colder, lower pressure fluid from the fourth conduit 322 in the mixing section 410 to transfer thermal energy to the colder, lower pressure fluid. In turn, the mixed fluid flows through the throat 412 and the diffuser 414, which help maintain pressure gradients in the jet pump 350 for efficient fluid flow, before entering the fifth conduit 324. As such, in the illustrated example of FIG. 4, the jet pump 350 causes the colder, lower pressure fluid to be removed from the pump 302 and mixed with hotter, higher temperature fluid without any moving parts.

Although the illustrated example of FIG. 4 shows one example implementation of the jet pump 350, it should be understood that other implementations can be utilized. For example, the jet pump 350 can include one or more movable parts that pull the colder, lower pressure fluid out of the housing 306 of the pump 302 and through the fourth conduit 322 and cause the colder, lower pressure fluid to mix with the hotter, higher pressure fluid from the third conduit 320 in the jet pump 350 and/or the fifth conduit 324. In some examples, the jet pump 350 includes more than one pump with movable parts. For example, a first implementation of the jet pump 350 can drive movement of the colder, lower pressure fluid out of the pump 302, through the fourth conduit 322, and into the fifth conduit 324, and a second implementation of the jet pump 350 can drive movement of the hotter, higher pressure fluid from the third conduit 320 into the fifth conduit 324.

Figure 5:
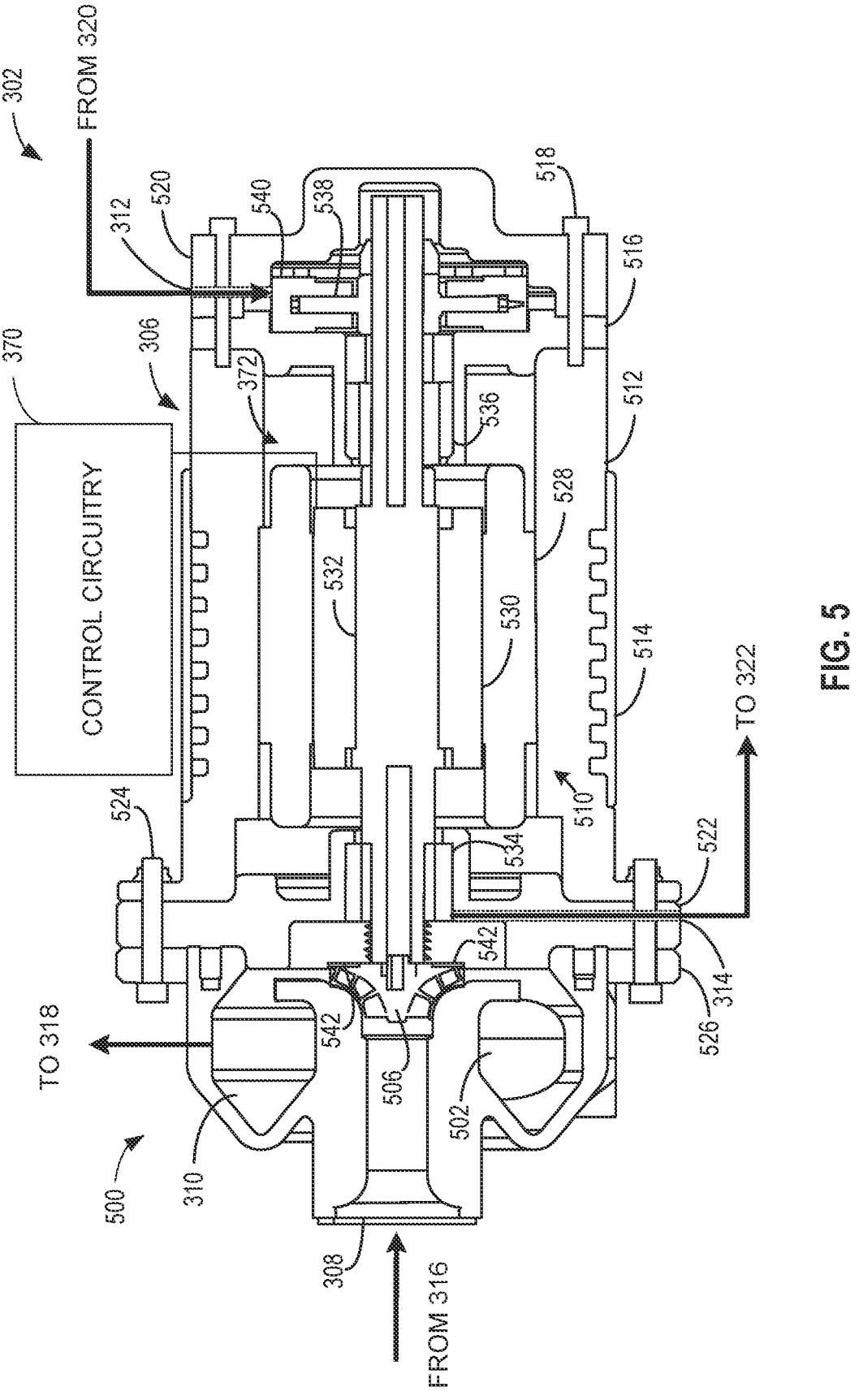
FIG. 5 is a schematic illustration of an example thermal transport bus pump of the example thermal management system of FIG. 3.

FIG. 5 is a schematic illustration of an example thermal transport bus pump 500 (e.g., a supercritical carbon dioxide (sCO$_2$) pump, the pump 302 of FIG. 3, etc.). In the illustrated example of FIG. 4, during normal operations, the thermal transport bus pump 302 drives a heat exchange fluid, such as gaseous and/or supercritical carbon dioxide, through the thermal transport bus 304 of FIG. 3 (e.g., through the conduits 316, 318, 320, 322, 324, 326, 328 of FIG. 3). Specifically, the heat exchange fluid from the first conduit 316 flows through the primary inlet 308 and encounters an impeller 506 (e.g., a compressor wheel) that rotates to drive the heat exchange fluid through the primary outlet 310 coupled to the second conduit 318. In turn, the thermal transport bus 304 can feed the heat exchange fluid to one or more heat exchangers (e.g., the heat exchanger(s) 330, 332, 334, 336, 352 of FIG. 3). Accordingly, the thermal transport bus pump 500 can pump the heat exchange fluid to manage a thermal energy of working fluids associated with the aircraft 10 of FIG. 1 and/or the gas turbine engine 100 of FIG. 2.

In the illustrated example of FIG. 5, the thermal transport bus pump 500 includes a motor 510 positioned in the housing 306. In FIG. 5, the motor 510 is an induction motor operatively coupled (e.g., communicatively coupled) to the control circuitry 370. For example, the control circuitry 370 can include, or be communicatively coupled to, a variable frequency drive (VFD) that controls a rotational speed of the motor 510. For example, the control circuitry 370 can operate the motor 510 based on an operational stage of the thermal management system 200, a pressure of the heat exchange fluid in the thermal transport bus 304 and/or in the thermal transport bus pump 302, and/or a temperature of the heat exchange fluid in the thermal transport bus 304 and/or in the thermal transport bus pump 302. Specifically, during pre-start operations, the control circuitry 370 causes the motor 510 to not drive (e.g., rotate) the impeller 506. Further, during normal operations, the control circuitry 370 causes a drive signal to be transmitted to the motor 510 such that the motor 510 drives the impeller 506 and, in turn, the pump 302 drives the heat exchange fluid. In some examples, during normal operations, the control circuitry 370 operates the motor 510 based on a pressure and/or a temperature of the working fluids affected by the heat exchange fluid. Additionally or alternatively, during normal operations, the control circuitry 370 can operate the motor 510 based on vibration measurements obtained by accelerometers operatively coupled to the thermal transport bus pump 302.

In FIG. 5, the housing 306 includes an intermediate housing 512, an aft bearing housing 516, an end cap 520, a forward bearing housing 522, and a backplate 526. The intermediate housing 512 is at least partially surrounded by a cooling jacket 514 to prevent the motor 510 from overheating during normal operations. An aft end of the intermediate housing 512 is coupled to the aft bearing housing 516 via first bolts 518. Furthermore, the end cap 520 is coupled to the aft bearing housing 516 and the intermediate housing 512 via the first bolts 518. A forward end of the intermediate housing 512 is coupled to the forward bearing housing 522 opposite the aft bearing housing 516 via second bolts 524. Moreover, the forward bearing housing 522 is coupled to the backplate 526, which defines the primary inlet 308 and the primary outlet 310, on an opposite side of the backplate 526 via the second bolts 524.

In the illustrated example of FIG. 5, the motor 510 includes a stator 528 to induce alternating electrical currents in field coils and emit alternating magnetic fields about a central axis of the motor 510. The alternating magnetic fields interact with permanent magnets of a rotor 530 and, in turn, provide torque to the rotor 530. The rotor 530 is fixedly coupled to an impeller shaft 532 ("shaft 532"), and a first end of the shaft 532 is fixedly coupled to the impeller 506. As such, the motor 510 drives a rotation of the shaft 532 and, in turn, a rotation of the impeller 506. The first end of the shaft 532 is supported by a first radial foil bearing 534, which is coupled to the forward bearing housing 522. Similarly, a second end of the shaft 532 is supported by a second radial foil bearing 536 coupled to the aft bearing housing 516.

The first radial foil bearing 534 and the second radial foil bearing 536 include spring-loaded foil journal linings that support radial loads of the shaft 532 during substantially low (e.g., startup) rotational speeds (e.g., 0-5,000 rotations per minute (rpm), etc.). When the heat exchange fluid is in the supercritical and/or gaseous state and the motor 510 causes the shaft 532 to rotate at a substantially high (e.g., operational) rotational speed (e.g., 5000-20,000 rpm, etc.), a pressure of the heat exchange fluid (e.g., air, oil, supercritical carbon dioxide ($sCO_2$, etc.) around the shaft 532 pushes the foil journal linings radially outward. Thus, when the heat exchange fluid is in the supercritical and/or gaseous state, the pressurized heat exchange fluid supports the radial loads of the shaft 532 when the shaft 532 is rotating at operational speeds (e.g., 3000 rpm, 10,000 rpm, 25,000 rpm, etc.).

In the illustrated example of FIG. 5, a thrust disc 538 of the shaft 532 is supported by a thrust bearing system 540. For example, the thrust bearing system 540 can include foil bearings to support axial loads of the shaft 532 via interactions with the thrust disc 538. In some examples, the thrust bearing system 540 is coupled to the aft bearing housing 516 and/or the end cap 520 via bolts. Accordingly, the first radial foil bearing 534, the second radial foil bearing 536, and the thrust bearing system 540 are positioned in the chamber 372 defined by the housing 306.

In some examples, the impeller 506 of the thermal transport bus pump 500 includes expeller vanes 542 on an aft portion of the impeller 506. During normal operations, at certain operational speeds of the motor 510, the expeller vanes 542 cause a portion of the heat exchange fluid (e.g., $sCO_2$) to flow forward from the forward bearing housing 522, the intermediate housing 512, etc. into a fluid conduit 502.

In the illustrated example of FIG. 5, the pump 302 includes the secondary inlet 312 and the secondary outlet 314. More particularly, the secondary inlet 312 is defined in the end cap 520, and the secondary outlet is defined in the forward bearing housing 522. As such, during pre-start operations, heated and pressurized heat exchange fluid that enters the housing 306 via the secondary inlet 312 can replace the heat exchange fluid that is in the liquid state in the housing 306. As a result, the radial foil bearings 534, 536 and the foil bearings in the thrust bearing system 540 can operate without encountering windage loss, a film thickness/stiffness, etc. that would otherwise prevent or hinder separation from the shaft 532 and/or the thrust disc 538.

The secondary inlet 312 and the secondary outlet 314 of FIG. 5 are illustrated as example configurations to reflect general locations of the secondary inlet 312 and the secondary outlet 314. The secondary inlet 312 and/or the secondary outlet 314 may be in alternative locations based on a design and/or configuration of the pump 302 and flow characteristics in the housing 306.

In some examples, the thermal management system 200 includes means for pumping. For example, the means for pumping may be implemented by the pump 302 of FIGS. 3 and/or 5. In some examples, the means for pumping includes means for driving a fluid. For example, the means for driving the fluid may be implemented by the motor 510, the shaft 532, and/or the impeller 506. In some examples, the means for pumping includes means for bearing the means for driving. For example, the means for bearing may be implemented by the first radial foil bearing 534, the second radial foil bearing 536, and/or the thrust bearing system 540. In some examples, the means for pumping includes means for containing the means for bearing. For example, the means for containing may be implemented by the housing 306, the aft bearing housing 516, the end cap 520, the forward bearing housing 522, and/or the backplate 526.

In some examples, the thermal management system 200 (FIGS. 2 and 3) includes means for conveying. For example, the means for conveying may be implemented by the thermal transport bus 304. In some examples, the means for conveying includes first means for conveying. For example, the first means for conveying may be implemented by the first conduit 316. In some examples, the means for conveying includes second means for conveying. For example, the second means for conveying may be implemented by the second conduit 318. In some examples, the means for conveying includes third means for conveying. For example, the third means for conveying may be implemented by the third conduit 320. In some examples, the means for conveying includes fourth means for conveying. For example, the fourth means for conveying may be implemented by the fourth conduit 322. In some examples, the means for conveying includes fifth means for conveying. For example, the fifth means for conveying may be implemented by the fifth conduit 324. In some examples, the means for conveying includes sixth means for conveying. For example, the sixth means for conveying may be implemented by the sixth conduit 326. In some examples, the means for conveying includes seventh means for conveying. For example, the seventh means for conveying may be implemented by the seventh conduit.

In some examples, the thermal management system 200 includes means for transferring heat. For example, the means for transferring heat may be implemented by the first heat exchanger 330, the second heat exchanger 332, the third heat exchanger 334, the fourth heat exchanger 336, and/or the fifth heat exchanger 352.

In some examples, the thermal management system 200 includes means for producing a pressure difference. For example, the means for producing may be implemented by the jet pump 350. In some examples, the means for producing is implemented by or includes means for passively producing the pressure difference. For example, the means for passively producing the pressure difference may be implemented by an eductor (e.g., the example implementation of the jet pump 350 discussed in association with FIG. 4). In some examples, the means for producing is implemented by or includes means for actively producing the pressure difference (e.g., with one or more moving parts). For example, the means for actively producing the pressure difference may be implemented by one or more scavenge pumps, one or more positive displacement pumps (e.g., gear pumps, screw pumps, rotary vane pumps, etc.), and/or one or more centrifugal pumps that do not include foil bearings.

In some examples, the thermal management system 200 includes means for pressurizing fluid. For example, the means for pressuring may be implemented by the pressurization device 356 (FIG. 3).

In some examples, the thermal management system 200 includes means for collecting liquid. For example, the means for collecting may be implemented by the liquid reservoir 366 (FIG. 3).

In some examples, the thermal management system 200 includes means for directing flow. For example, the means for directing may be implemented by the first valve 338, the second valve 340, the third valve 342, the first check valve 354, the fourth valve 358, the fifth valve 360, the sixth valve 362, the second check valve 363, the seventh valve 364, and/or the third check valve 365.

In some examples, the thermal management system 200 includes means for measuring fluid parameters. For example, the means for measuring may be implemented by the sensor(s) 368.

In some examples, the thermal management system 200 includes means for controlling operations. For example, the means for controlling may be implemented by the control circuitry 370. In some examples, the control circuitry 370 may be instantiated by programmable circuitry such as the example programmable circuitry 712 of FIG. 7 (described presently). For instance, the control circuitry 370 may be instantiated by a microprocessor executing machine executable instructions such as those implemented by at least blocks 602, 604, 606, 608, 610, 612, 614, 616 of FIG. 6. In some examples, the control circuitry 370 may be instantiated by hardware logic circuitry, which may be implemented by an ASIC, XPU, or FPGA circuitry configured and/or structured to perform operations corresponding to the machine readable instructions. Additionally or alternatively, the control circuitry 370 may be instantiated by any other combination of hardware, software, and/or firmware. For example, the control circuitry 370 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The example control circuitry 370 could be implemented by programmable circuitry in combination with machine readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs.

Figure 6:
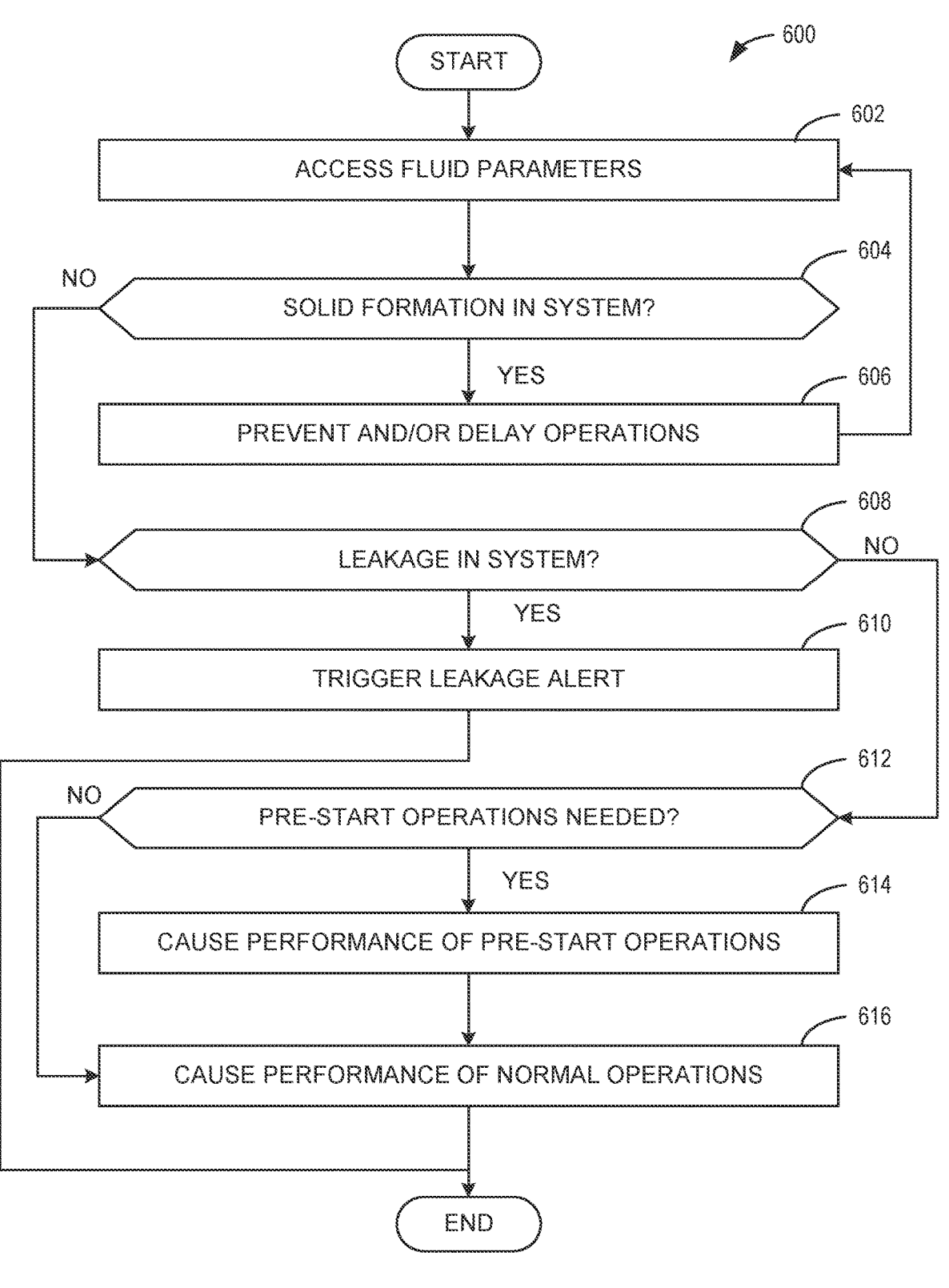
FIG. 6 is a flowchart representative of example machine readable instructions and/or example operations that may be executed, instantiated, and/or performed by example programmable circuitry to implement the control circuitry of FIG. 3.

A flowchart representative of example machine readable instructions, which may be executed by programmable circuitry to implement and/or instantiate the control circuitry 370 of FIG. 3 and/or representative of example operations which may be performed by programmable circuitry to implement and/or instantiate the control circuitry 370 of FIG. 3, is shown in FIG. 6. The machine readable instructions may be one or more executable programs or portion(s) of one or more executable programs for execution by programmable circuitry such as the programmable circuitry 712 shown in the example processor platform 700 discussed below in connection with FIG. 7. In some examples, the machine readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart illustrated in FIG. 6, many other methods of implementing the example control circuitry 370 may alternatively be used. For example, the order of execution of the blocks of the flowchart may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine readable instructions may be fragmented and stored on one or more storage devices, disks and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable, computer readable and/or machine readable media, as used herein, may include instructions and/or program(s) regardless of the particular format or state of the machine readable instructions and/or program(s).

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIG. 6 may be implemented using executable instructions (e.g., computer readable and/or machine readable instructions) stored on one or more non-transitory computer readable and/or machine readable media. As used herein, the terms non-transitory computer readable medium, non-transitory computer readable storage medium, non-transitory machine readable medium, and/or non-transitory machine readable storage medium are expressly defined to include any type of computer readable storage device and/or storage disk and to exclude propagating signals and to exclude transmission media. Examples of such non-transitory computer readable medium, non-transitory computer readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer-readable instructions, machine-readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, "causing" performance of an operation may include triggering, facilitating, generating, sending, transmitting, etc. For example, causing performance of a certain operation can include triggering performance of the operation, facilitating performance of the operation, generating one or more signals that causes the operation to be performed, and/or sending or transmitting the signal(s) that cause the operation to be performed.

FIG. 6 is a flowchart representative of example machine readable instructions and/or example operations 600 that may be executed, instantiated, and/or performed by programmable circuitry to remove fluid in the liquid state from a housing (e.g., the housing 306 of FIGS. 3 and 5) containing foil bearings (e.g., the radial foil bearings 534, 536, the foil bearings of the thrust bearing assembly of FIGS. 3 and 5). The example machine-readable instructions and/or the example operations 600 of FIG. 6 begin at block 602, at which the control circuitry 370 (FIGS. 3 and 5) accesses fluid parameters. For example, the control circuitry 370 can access measurements from the sensor(s) 368 (FIG. 3). In some examples, the control circuitry 370 accesses a temperature and/or a pressure of the fluid in the thermal management system 200 (FIGS. 2 and 3). For example, the control circuitry 370 can identify that the fluid ($CO_2$) in the thermal management system 200 has a temperature of 11° F. and a pressure of 56 bar based on readings from the sensor(s) 368.

At block 604, the control circuitry 370 determines whether there is a solid formation in the thermal manage- ment system 200. For example, when the pressure of the fluid satisfies (e.g., is less than or equal to, is less than) a first pressure threshold (e.g., a critical point pressure associated with the fluid) and the temperature of the fluid does not satisfy (e.g., is less than or equal to, is less than) a first temperature threshold (e.g., triple point temperature associ- ated with the fluid), the control circuitry 370 determines that there is a solid formation (e.g., dry ice) in the pump 302 (FIG. 3) and/or the thermal transport bus 304 (FIG. 3). When the control circuitry 370 determines that the fluid has converted to a solid state in the pump 302 and/or the thermal transport bus 304 (e.g., block 604 returns a result of "YES"), the operations 600 proceed to block 606. Otherwise, when the control circuitry 370 determines that the fluid has not converted to a solid state in the pump 302 and/or the thermal transport bus 304 (e.g., block 604 returns a result of "NO"), the operations 600 skip to block 608. In this example, with the fluid having a temperature of 11° F., which is greater than the triple point temperature of −69.88° F. for $CO_2$, the operations skip to block 608.

At block 606, in response to determining that there is a solid in the pump 302 and/or the thermal transport bus 304, the control circuitry 370 prevents and/or delays operation of the thermal management system 200. For example, the control circuitry 370 can delay an activation of the pump 302 and/or other components in the thermal management system 200 until the temperature satisfies the first temperature threshold. In some examples, the control circuitry 370 causes an alert to be rendered to an operator associated with the thermal management system 200 in response to detecting the solid formation. In some examples, in response to the pressure not satisfying the first pressure threshold and the temperature not satisfying the first temperature threshold, the control circuitry 370 causes the sixth valve 362 (FIG. 3) to be in the associated second position (e.g., the open position for the seventh conduit 328 (FIG. 3), the closed position for the downstream portion of the fourth conduit 322 (FIG. 3)) to prevent the jet pump 350 (FIG. 3) from pulling in fluid from the fourth conduit 322 and, thus, prevent movement of the fluid in the thermal transport bus 304. In some examples, the control circuitry 370 waits a predetermined period before re-analyzing the pressure and/ or the temperature to determine whether the solid has been converted to a liquid state. In response to preventing and/or delaying operation of the thermal management system 200, the operations 600 return to block 602.

At block 608, the control circuitry 370 determines whether there is leakage in the thermal management system 200. For example, the control circuitry 370 can determine that there is leakage when the temperature satisfies (e.g., is greater than, is greater than or equal to) the first temperature threshold and the pressure does not satisfy (e.g., is less than or equal to, is less than) the first pressure threshold nor a second pressure threshold (e.g., a triple point pressure of the fluid). When the control circuitry 370 determines that there is a leakage in the thermal management system 200 (e.g., block 608 returns a result of "YES"), the operations 600 proceed to block 610. Otherwise, when the control circuitry 370 determines that there is no leakage in the thermal management system 200 (e.g., block 608 returns a result of "NO"), the operations 600 skip to block 612. In this example, with the pressure of the fluid in the thermal management system 200 being 56 bar, which is greater than the 5.18 bar triple point pressure of $CO_2$, the operations 600 skip to block 612.

At block 610, the control circuitry 370 triggers a leakage alert. For example, the control circuitry 370 can cause a leakage alert to be delivered to an operator associated with the thermal management system 200. In some examples, the control circuitry 370 causes the alert to be visually, audibly, and/or haptically delivered. After the control circuitry 370 causes the leakage alert to be delivered, the operations 600 terminate to provide one or more operator(s) time to address the leakage.

At block 612, the control circuitry 370 determines whether pre-start operations are needed. For example, the control circuitry 370 can determine the pre-start operations are needed when at least a portion of the fluid in the thermal management system 200 is in a sub-critical state. More particularly, when the pressure satisfies the first pressure threshold and the temperature does not satisfy (e.g., is less than) a second temperature threshold (e.g., a critical point temperature associated with the fluid, a temperature between the critical point and the triple point temperatures associated with the fluid), the control circuitry 370 determines that at least a portion of the fluid in the thermal management system 200 is in a sub-critical state. Similarly, when the temperature satisfies the first temperature threshold and the pressure is between the first pressure threshold and the second pressure threshold, the control circuitry 370 determines that at least a portion of the fluid in the thermal management system 200 is in the sub-critical state. Alternatively, when the pressure satisfies the first pressure threshold and the temperature satisfies the second temperature threshold, the control cir- cuitry 370 determines that the fluid is in a supercritical and/or gaseous state that enables performance of normal operations. Thus, when the control circuitry 370 determines that pre-start operations are needed (e.g., block 612 returns a result of "YES"), the operations proceed to block 614. Otherwise, when the control circuitry 370 determines that pre-start operations are not needed (e.g., block 612 returns a result of "NO"), the operations skip to block 616. In this example, with the 56 bar pressure of the fluid in the thermal management system 200 being between the 5.18 bar triple point pressure and the 73.8 bar critical point pressure for $CO_2$ and the 11° F. temperature of the fluid being greater than the −69.88° F. triple point temperature for $CO_2$, the operations 600 proceed to block 614.

At block 614, the control circuitry 370 causes the pre-start operations to be performed. For example, the control cir- cuitry 370 causes pre-start operations to be performed before the pump 302 begins operating (e.g., before the motor drives a rotation of the impeller of the pump 302, before power is delivered to the motor of the pump 302) to cause the fluid to reach the supercritical and/or gaseous state. To cause the pre-start operations to be performed, the control circuitry 370 causes the fourth valve 358 (FIG. 3) to be in the associated first position (e.g., the open position); the control circuitry 370 causes the fifth valve 360 (FIG. 3) to be in the associated first position (e.g., the closed position); the con- trol circuitry 370 causes the sixth valve 362 to be in the associated first position (e.g., the closed position for the seventh conduit 328, the open position for a downstream portion of the fourth conduit 322); and the control circuitry 370 causes the seventh valve 364 (FIG. 3) to be in the associated first position (e.g., the closed position). Addition- ally, the control circuitry 370 can cause the first valve 338 (FIG. 3) to be in a position in which at least a portion of the fluid in the second conduit 318 (FIG. 3) flows into the third conduit 320 (FIG. 3). For example, the control circuitry 370 can transmit control signals to the valves 338, 358, 360, 362, 364 to cause the valves 338, 358, 360, 362, 364 to move to the associated first positions for the pre-start operations. As a result, during the pre-start operations, the fifth heat exchanger 352 (FIG. 3) and/or the pressurization device 356 (FIG. 3) increase the pressure and/or the temperature of the fluid in the third conduit 320. For example, the fifth heat exchanger 352 and/or the pressurization device 356 can heat the fluid to a gaseous state and/or a supercritical state. Further, a first portion of the fluid in the third conduit 320 flows into the jet pump 350 and a second portion of the fluid in the third conduit 320 flows through the secondary inlet 312 (FIG. 3) of the pump 302. As such, heated, higher pressure fluid is induced into the housing 306 and pushes cooler and/or lower pressure fluid through the secondary outlet 314 (FIG. 3). The pressure differential formed by the jet pump 350 also pulls cooler and/or lower pressure fluid out of the housing 306 (FIG. 3) and through the fourth conduit 322. Accordingly, the cooler and/or lower pressure fluid in the housing 306 is replaced with warmer and/or higher pressure fluid. More particularly, fluid in the housing 306 that is in the liquid state is replaced with fluid in the gaseous and/or supercritical state. As a result, when the liquid is removed from the housing 306, foil bearings in the pump 302 can operate without encountering windage loss, an increased film thickness/stiffness, etc. that would otherwise result from operating with liquid in the housing 306 and adversely affect the functionality of the pump 302. Furthermore, the jet pump 350 outputs a mixture of the warmer, higher pressure fluid from the third conduit 320 and the cooler, lower pressure fluid from the fourth conduit 322 into the fifth conduit 324 (FIG. 3). As a result, the fluids mix and the temperature and/or the pressure of the fluid from the fourth conduit 322 increase. The liquid reservoir 366 (FIG. 3) downstream of the jet pump 350 collects the fluid in the fifth conduit 324 that remains in the liquid state and enables the temperature and/or the pressure of the fluid to increase before re-entering the flowline in the fifth conduit 324. The fifth conduit 324 carries (e.g., conveys, transports, etc.) the fluid to the first conduit 316. Accordingly, the fluid can circulate through the thermal transport bus 304 while the fifth heat exchanger 352, the pressurization device 356, the jet pump 350, and/or the liquid reservoir 366 help heat and pressurize the fluid to convert the fluid in the thermal management system 200 that is in the liquid state to a gaseous and/or supercritical state. In some examples, the control circuitry 370 causes the thermal management system 200 to perform the pre-start operations for a predetermined period of time (e.g., 20 seconds, 1 minute, 2 minutes, etc.). In some examples, the control circuitry 370 determines the predetermined period of time based on the measured pressure and/or temperature of the fluid. In some examples, the control circuitry 370 monitors the temperature and/or the pressure of the fluid and causes the thermal management system 200 to switch from the pre-start operations to normal operations when the pressure satisfies (e.g., is greater than, is greater than or equal to) the first pressure threshold and the temperature satisfies (e.g., is greater than, is greater than or equal to) the second temperature threshold. In some examples, when the pre-start operations increase the initial 56 bar pressure of the fluid in the thermal management system 200 to a pressure greater than or equal to the 73.8 bar critical point pressure for $CO_2$ and increase the 11° F. temperature of the fluid to a temperature greater than or equal to the 87.8° F. critical point temperature for $CO_2$, the control circuitry 370 causes the operations 600 proceed to block 616. In some examples, when the temperature is greater than or equal to the 87.8° F. critical point temperature for $CO_2$ and the pressure is less than or equal to the 73.8 bar critical point pressure for $CO_2$, the control circuitry 370 determines that the fluid is in a gaseous state that will convert to a supercritical state during normal operations or otherwise enables normal operations to occur without adversely affecting the foil bearings of the pump 302. In such examples, the control circuitry 370 triggers performance of the normal operations, and the operations 600 proceed to block 616.

At block 616, the control circuitry 370 causes normal operations to be performed. When the fluid in the thermal management system 200 is in the supercritical state, the control circuitry 370 causes the thermal management system 200 to begin normal operations. To cause the normal operations to begin, the control circuitry 370 causes (i) the fourth valve 358 to move to, or remain in, the associated second position (e.g., the closed position); (ii) the fifth valve 360 to move to, or remain in, the associated second position (e.g., the open position); (iii) the sixth valve 362 to move to, or remain in, the associated second position (e.g., the open position for the seventh conduit 328, the closed position for the downstream portion of the fourth conduit 322); and the seventh valve 364 to move to, or remain in, the associated second position (e.g., the open position). Further, the control circuitry 370 causes the pump 302 to drive the fluid through the thermal transport bus 304. For example, the control circuitry 370 can transmit control signals to the valves 358, 360, 362, 364 to cause the valves 358, 360, 362, 364 to move to the associated second positions. Further, the control circuitry 370 can transmit a control signal to the motor 510 of the pump 302 to cause the shaft 532 and, in turn, the impeller 506 of the pump 302 to rotate and drive the fluid through the thermal transport bus 304. During the normal operations, the fourth valve 358 blocks the fluid in the third conduit 320 from flowing past and, thus, causes all of the fluid in the third conduit 320 between the fourth valve 358 and the pressurization device 356 to flow through the jet pump 350. The fifth valve 360 allows a portion of the fluid in the third conduit downstream of the fifth heat exchanger 352 to enter the fifth conduit 324. The sixth valve 362 blocks the fluid in the fourth conduit 322 from reaching the second inlet 353 (FIG. 3) of the jet pump 350. Accordingly, the sixth valve 362 prevents a pressure differential formed by the jet pump 350 from directing movement of the fluid in the pump housing 306 and, instead, allows the impeller of the pump 302 to drive the fluid to the heat exchangers 330, 332, 334, 336, 352 (FIG. 3) for operational support of the aircraft 10 and/or the gas turbine engine 100. Additionally, the seventh valve 364 enables a portion of the fluid in the second conduit 318 to enter the sixth conduit 326 (FIG. 3) and, in turn, a portion of the third conduit 320 between the fourth valve 358 and the secondary inlet 312. As a result, the fluid can enter the pump housing 306. Moreover, the sixth valve 362 enables the seventh conduit 328 to recirculate the fluid that exits the pump housing 306 via the secondary outlet 314 to the first conduit 316 (FIG. 3). As such, the flowlines formed by the sixth valve 362 and the seventh valve 364 enable a circulation of the fluid in the pump housing 306, which can provide lubrication between the foil bearings and the shaft of the pump 302.

Figure 7:
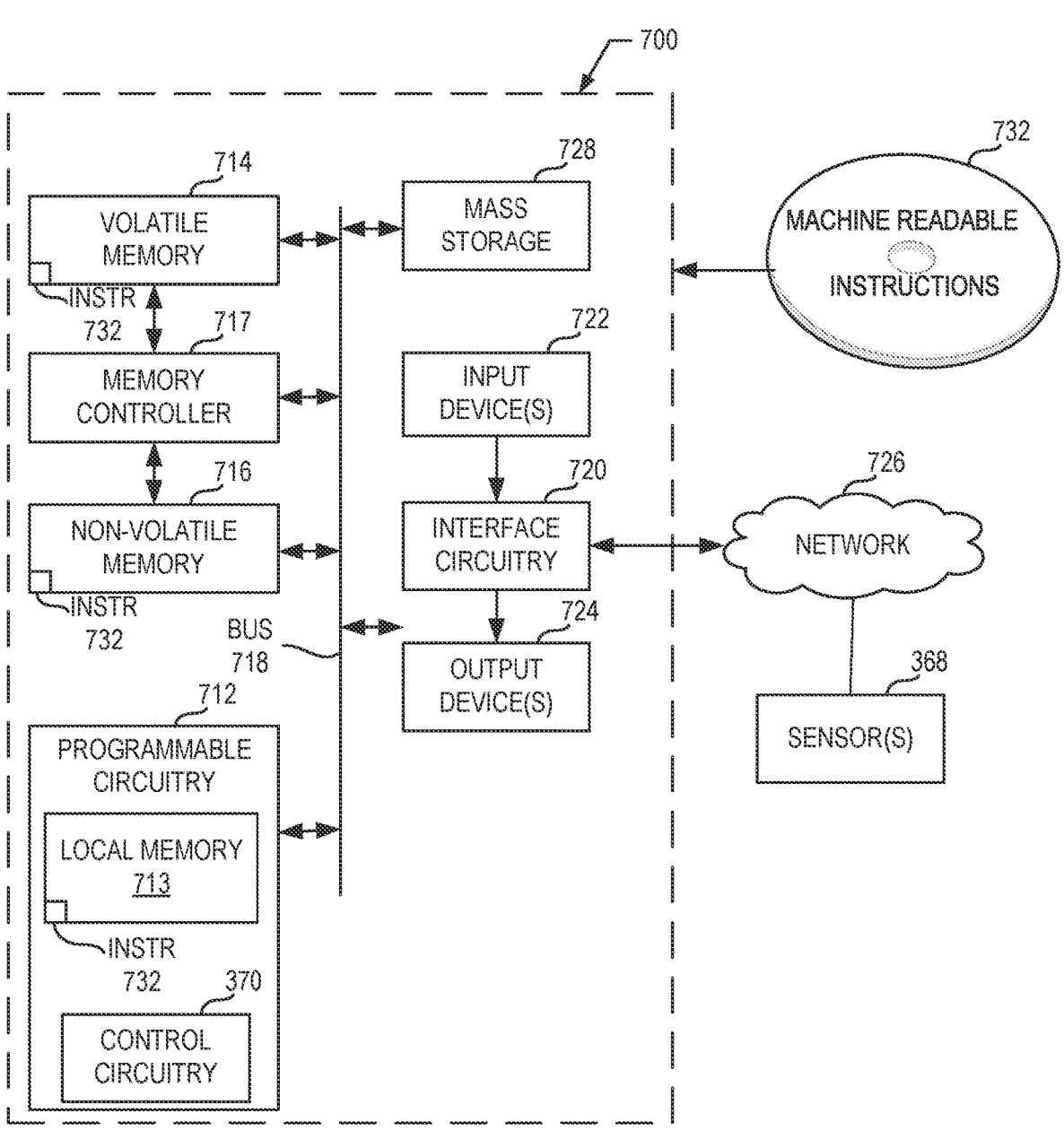
FIG. 7 is a block diagram of an example processing platform including programmable circuitry structured to execute, instantiate, and/or perform the example machine readable instructions and/or perform the example operations of FIG. 6 to implement the control circuitry of FIG. 3.

FIG. 7 is a block diagram of an example programmable circuitry platform 700 structured to execute and/or instantiate the example machine-readable instructions and/or the example operations of FIG. 6 to implement the control circuitry 370 of FIG. 3. The programmable circuitry platform 700 can be, for example, a digital computer (e.g., a Full Authority Digital Engine Control (FADEC), an Electronic Engine Control (EEC), an engine control unit (ECU), etc.) or any other type of computing and/or electronic device.

The programmable circuitry platform 700 of the illustrated example includes programmable circuitry 712 (e.g., processor circuitry). The programmable circuitry 712 of the illustrated example is hardware. For example, the programmable circuitry 712 can be implemented by one or more integrated circuits, logic circuits, FPGAs, microprocessors, CPUs, GPUs, DSPs, and/or microcontrollers from any desired family or manufacturer. The programmable circuitry 712 may be implemented by one or more semiconductor based (e.g., silicon based) devices. In this example, the programmable circuitry 712 implements the control circuitry 370.

The programmable circuitry 712 of the illustrated example includes a local memory 713 (e.g., a cache, registers, etc.). The programmable circuitry 712 of the illustrated example is in communication with main memory 714, 716, which includes a volatile memory 714 and a non-volatile memory 716, by a bus 718. The volatile memory 714 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 716 may be implemented by flash memory and/or any other desired type of memory device. Access to the main memory 714, 716 of the illustrated example is controlled by a memory controller 717. In some examples, the memory controller 717 may be implemented by one or more integrated circuits, logic circuits, microcontrollers from any desired family or manufacturer, or any other type of circuitry to manage the flow of data going to and from the main memory 714, 716.

The programmable circuitry platform 700 of the illustrated example also includes interface circuitry 720. The interface circuitry 720 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 722 are connected to the interface circuitry 720. The input device(s) 722 permit(s) a user (e.g., a human user, a machine user, etc.) to enter data and/or commands into the programmable circuitry 712. The input device(s) 722 can be implemented by, for example, an audio sensor, a microphone, a camera (still or video), a keyboard, a button, a mouse, a touchscreen, a trackpad, a trackball, an isopoint device, and/or a voice recognition system.

One or more output devices 724 are also connected to the interface circuitry 720 of the illustrated example. The output device(s) 724 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 720 of the illustrated example, thus, typically includes a graphics driver card, a graphics driver chip, and/or graphics processor circuitry such as a GPU.

The interface circuitry 720 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 726. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc. In this example, the sensor(s) 368 are in communication with the interface circuitry 720 via the network 726.

The programmable circuitry platform 700 of the illustrated example also includes one or more mass storage discs or devices 728 to store firmware, software, and/or data. Examples of such mass storage discs or devices 728 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

Machine readable instructions 732 (e.g., coded instructions), which may be implemented by the machine readable instructions of FIG. 6, may be stored in the mass storage device 728, in the volatile memory 714, in the non-volatile memory 716, and/or on at least one non-transitory computer readable storage medium such as a CD or DVD which may be removable.

From the foregoing, it will be appreciated that example systems, apparatus, articles of manufacture, and methods have been disclosed that remove fluid that is in a liquid state from a housing containing foil bearings. As a result, the examples disclosed herein enable the foil bearings to operate without encountering windage loss, an increased film thickness/stiffness, etc., that would otherwise result from operating with liquid in and/or around the foil bearings.

Example methods, apparatus, systems, and articles of manufacture to remove liquid from a housing are disclosed herein. Further aspects are provided by the subject matter of the following clauses:

A system comprising a pump including a chamber, a shaft positioned at least partially in the chamber and a bearing to support the shaft, the chamber including a chamber inlet and a chamber outlet, the chamber to hold a fluid in a first state, a first conduit to carry the fluid in a second state of the fluid, the first conduit fluidly coupled to the chamber inlet, a second conduit to carry the fluid in the first state of the fluid, the second conduit fluidly coupled to the chamber outlet, at least one jet pump including a first inlet fluidly coupled to a portion of the first conduit upstream of the chamber inlet, a second inlet fluidly coupled to the second conduit downstream of the chamber outlet, and an outlet to deliver a mixture of the fluid in the first state of the fluid and the second state of the fluid to a third conduit, and a heat exchanger coupled to the first conduit upstream of the first inlet.

The system of any preceding clause, further including a first valve coupled to the first conduit between the chamber inlet and the first inlet, the first valve in a first position during first operations and in a second position during second operations.

The system of any preceding clause, wherein a temperature of the fluid does not satisfy a temperature threshold and a pressure of the fluid does not satisfy a pressure threshold during the first operations, and wherein the temperature of the fluid satisfies the temperature threshold and the pressure of the fluid satisfies the pressure threshold during the second operations.

The system of any preceding clause, further including a pump output conduit, wherein the pump includes an impeller to drive the fluid through the pump output conduit, and wherein the pump output conduit is fluidly coupled to the first conduit between the chamber inlet and the first inlet during the second operations.

The system of any preceding clause, further including programmable circuitry to cause the first operations to occur in advance of a motor of the pump rotating the shaft.

The system of any preceding clause, wherein the bearing is a foil bearing, the fluid in the first state is liquid carbon dioxide, and the fluid in the second state is at least one of gaseous or supercritical carbon dioxide.

The system of any preceding clause, wherein the at least one jet pump is an eductor.

The system of any preceding clause, further including a second valve coupled to the second conduit between the chamber outlet and the second inlet, the second valve in a first position during first operations and a second position during second operations.

The system of any preceding clause, further including a fourth conduit fluidly coupled to an impeller inlet of the pump, wherein the second conduit is fluidly coupled to the second inlet when the second valve is in the first position, and wherein the second conduit is fluidly coupled to the fourth conduit when the second valve is in the second position.

The system of any preceding clause, wherein the second conduit carries the fluid in the first state of the fluid when the second valve is in the first position, and wherein the second conduit carries the fluid in the second state of the fluid when the second valve is in the second position.

The system of any preceding clause, further including a valve coupled to at least one of the first conduit or the third conduit, wherein the valve is in a first position during first operations and a second position during second operations after the first operations, the fluid to flow from the first conduit to the third conduit during the second operations and not the first operations.

The system of any preceding clause, wherein at least one of a temperature of the fluid does not satisfy a temperature threshold or a pressure of the fluid does not satisfy a pressure threshold during the first operations, and wherein the temperature of the fluid satisfies the temperature threshold and the pressure of the fluid satisfies the pressure threshold in the second operations.

The system of any preceding clause, further including a valve coupled to the first conduit or an outlet of the heat exchanger, wherein the valve is in a closed position when a pressure of the fluid in the heat exchanger does not satisfy a pressure threshold, and wherein the valve is in an open position when the pressure of the fluid in the heat exchanger satisfies the pressure threshold.

The system of any preceding clause, further including a liquid reservoir for the fluid in the first state of the fluid coupled to the third conduit downstream of the outlet of the at least one jet pump.

A system comprising a first pump including a primary inlet, a primary outlet, a secondary inlet, and a secondary outlet, a first conduit including an end coupled to the first pump at the secondary inlet, a second conduit including an end coupled to the first pump at the secondary outlet, at least one second pump including a first inlet, a second inlet, and an outlet, the first inlet coupled to the first conduit upstream of the secondary inlet, the second inlet coupled to the second conduit downstream of the secondary outlet, a third conduit coupled to the outlet of the at least one second pump, and a heat exchanger coupled to the first conduit upstream of the first inlet.

The system of any preceding clause, wherein the at least one second pump is an eductor.

The system of any preceding clause, further including a valve coupled to the first conduit, and control circuitry to cause the valve to be in a first position that causes a first portion of fluid in the first conduit upstream of the valve to flow past the valve when a pressure of the fluid does not satisfy a pressure threshold or a temperature of the fluid does not satisfy a temperature threshold, a second portion of the fluid in the first conduit upstream of the valve to flow through the first inlet of the at least one second pump when the valve is in the first position, and cause the valve to be in a second position that blocks the fluid from flowing past the valve when the pressure of the fluid satisfies the pressure threshold and the temperature of the fluid satisfies the temperature threshold, the fluid to flow through the first inlet of the at least one second pump when the valve is in the second position.

The system of any preceding clause, further including a valve coupled to the second conduit, and control circuitry to cause the valve to be in a first position that causes fluid in the second conduit upstream of the valve to flow into the second inlet of the at least one second pump when a pressure of the fluid does not satisfy a pressure threshold or a temperature of the fluid does not satisfy a temperature threshold, and cause the valve to be in a second position that blocks the fluid in the second conduit upstream of the valve from flowing into the second inlet of the at least one second pump when the pressure of the fluid satisfies the pressure threshold and the temperature of the fluid satisfies the temperature threshold.

A system comprising means for pumping including means for driving a fluid, means for bearing the means for driving, and means for containing the means for bearing, the fluid in a first state of the fluid in the means for containing during first operations, the fluid in a second state of the fluid in the means for containing during second operations after the first operations, first means for conveying, the first means for conveying to convey the fluid in the second state of the fluid to the means for containing during the first operations, second means for conveying to convey the fluid in the first state of the fluid away from the means for containing, third means for conveying to convey the fluid in the first state and the second state of the fluid away from the means for containing downstream of the first means for conveying and the second means for conveying, means for producing a pressure difference that causes the fluid from the first means for conveying and the second means for conveying to flow away from the means for containing into the third means for conveying, and means for transferring heat to the fluid in the first means for conveying.

The system of any preceding clause, further comprising means for controlling operations to cause the first operations to occur when a pressure of the fluid does not satisfy a first pressure threshold or a temperature of the fluid does not satisfy a first temperature threshold, the means for controlling operations to cause the means for driving the fluid to drive the fluid during the second operations, the means for controlling operations to cause third operations to occur when at least one of (i) the pressure of the fluid does not satisfy a second pressure threshold less than the first pressure threshold or (ii) the temperature of the fluid does not satisfy a second temperature threshold less than the first temperature threshold, the means for controlling operations to prevent the means for producing the pressure difference and the means for pumping from moving the fluid during the third operations.

The system of any preceding clause, wherein the liquid carbon dioxide transitions to the at least one of gaseous or supercritical carbon dioxide downstream of the eductor.

A system comprising a pump including a chamber, the chamber including a fluid in a first state during first operations, the chamber including a chamber inlet and a chamber outlet, a first conduit to carry the fluid in a second state, the conduit fluidly coupled to the chamber inlet, a second conduit to carry the fluid in the first state during the first operations, the second conduit fluidly coupled to the chamber outlet, an eductor including a first inlet fluidly coupled to the first conduit upstream of the chamber inlet, a second inlet fluidly coupled to the second conduit downstream of the chamber outlet, and an outlet to deliver a mixture of the fluid in the first state and the second state, a third conduit coupled to an outlet of the eductor, and a heat exchanger coupled to the first conduit upstream of the first inlet.

A system comprising a pump including a chamber, a fluid in a first state of the fluid in the chamber during first operations, the fluid in a second state of the fluid in the chamber during second operations after the first operations, the chamber including a chamber inlet and a chamber outlet, a first conduit fluidly coupled to the chamber inlet, a second conduit fluidly coupled to the chamber outlet, an eductor including a first inlet fluidly coupled to the first conduit upstream of the chamber inlet, a second inlet fluidly coupled to the second conduit downstream of the chamber outlet, and an outlet to deliver a mixture of the fluid in the first state of the fluid and the second state of the fluid, a third conduit coupled to an outlet of the eductor, and a heat exchanger coupled to the first conduit upstream of the first inlet.

A system comprising a pump including an impeller inlet, a chamber, a chamber inlet, and a chamber outlet, the chamber holding a fluid in a first state during first operations, the chamber holding the fluid in a second state during second operations after the first operations, a first conduit including an end coupled to the chamber at the chamber inlet, a second conduit including an end coupled to the chamber outlet, a third conduit fluidly coupled to a portion of the first conduit upstream of the chamber inlet, the third conduit fluidly coupled to the second conduit downstream of the chamber outlet during the first operations, the third conduit defining a flow path in which the fluid flows towards the impeller inlet, and a heat exchanger coupled to the first conduit upstream of the portion of the first conduit.

The system of any preceding clause, further including a jet pump including a first inlet fluidly coupled to the first conduit, a second inlet fluidly coupled to the second conduit, and an outlet fluidly coupled to the third conduit.

The system of any preceding clause, wherein the jet pump is an eductor.

The system of any preceding clause, further including a fourth conduit fluidly coupled to the second conduit during the second operations, wherein the second conduit is to carry the fluid in the first fluid state during the first operations, and wherein the second conduit is to carry the fluid in the second fluid state during second operations.

The system of any preceding clause, wherein the first conduit is to carry the fluid in the second fluid state during the first operations and the second operations.

The system of any preceding clause, further including a second heat exchanger operatively coupled to the third conduit upstream of the impeller inlet.

The system of any preceding clause, further including a valve coupled to the first conduit or an outlet of the heat exchanger, wherein the valve is in a closed position when the pressure of the fluid in the heat exchanger does not satisfy a pressure threshold, and wherein the valve is in an open position when the pressure of the fluid in the heat exchanger satisfies the pressure threshold.

The system of any preceding claim, further including a supplementary conduit coupled to the liquid reservoir and the first conduit upstream of the heat exchanger, the supplementary conduit to transport the fluid in the first state from the liquid reservoir to the first conduit.

The system of any preceding clause, further including a pressurization device coupled to the first conduit between the heat exchanger and the first inlet.

The system of any preceding clause, further including programmable circuitry to access fluid parameters; determine whether there is a solid formation in the system based on the accessed fluid parameters; and at least one of prevent or delay operations in response determining that there is a solid formation in the system.

The system of any preceding clause, further including programmable circuitry to access fluid parameters; determine whether there is a leakage in the system based on the accessed fluid parameters; and trigger a leakage alert in response to determining that there is a leakage.

The system of any preceding clause, further including programmable circuitry to access fluid parameters; cause performance of pre-start operations in response to a temperature of the fluid not satisfying a temperature threshold and a pressure of the fluid not satisfying a pressure threshold; and cause performance of normal operations in response to the temperature of the fluid satisfying the temperature threshold and the pressure of the fluid satisfying the pressure threshold.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. A system comprising:
   a pump including a chamber, a shaft positioned at least partially in the chamber and a bearing to support the shaft, the chamber including a chamber inlet and a chamber outlet, the chamber to hold a fluid in a first state;
   a first conduit to carry the fluid in a second state of the fluid, the first conduit fluidly coupled to the chamber inlet;
   a second conduit to carry the fluid in the first state of the fluid, the second conduit fluidly coupled to the chamber outlet;
   at least one jet pump including a first inlet fluidly coupled to a portion of the first conduit upstream of the chamber inlet, a second inlet fluidly coupled to the second conduit downstream of the chamber outlet, and an outlet to deliver a mixture of the fluid in the first state of the fluid and the second state of the fluid to a third conduit, wherein the second inlet of the at least one jet pump receives a flow of the fluid during first operations before the pump begins operating during second operations; and
   a heat exchanger coupled to the first conduit upstream of the first inlet.

2. The system of claim 1, further including a first valve coupled to the first conduit between the chamber inlet and the first inlet, the first valve in a first position during the first operations and in a second position during the second operations.

3. The system of claim 2, wherein a temperature of the fluid does not satisfy a temperature threshold and a pressure of the fluid does not satisfy a pressure threshold during the first operations, and wherein the temperature of the fluid satisfies the temperature threshold and the pressure of the fluid satisfies the pressure threshold during the second operations.

4. The system of claim 3, further including a pump output conduit, wherein the pump includes an impeller to drive the fluid through the pump output conduit, and wherein the pump output conduit is fluidly coupled to the first conduit between the chamber inlet and the first inlet during the second operations.

5. The system of claim 2, further including programmable circuitry to cause the first operations to occur in advance of a motor of the pump rotating the shaft.

6. The system of claim 1, wherein the bearing is a foil bearing, the fluid in the first state is liquid carbon dioxide, and the fluid in the second state is at least one of gaseous or supercritical carbon dioxide.

7. The system of claim 1, wherein the at least one jet pump is an eductor.

8. The system of claim 1, further including a second valve coupled to the second conduit between the chamber outlet and the second inlet, the second valve in a first position during the first operations and a second position during the second operations.

9. The system of claim 8, further including a fourth conduit fluidly coupled to an impeller inlet of the pump, wherein the second conduit is fluidly coupled to the second inlet when the second valve is in the first position, and wherein the second conduit is fluidly coupled to the fourth conduit when the second valve is in the second position.

10. The system of claim 8, wherein the second conduit carries the fluid in the first state of the fluid when the second valve is in the first position, and wherein the second conduit carries the fluid in the second state of the fluid when the second valve is in the second position.

11. The system of claim 1, further including a valve coupled to at least one of the first conduit or the third conduit, wherein the valve is in a first position during the first operations and a second position during the second operations after the first operations, the fluid to flow from the first conduit to the third conduit during the second operations and not the first operations.

12. The system of claim 11, wherein at least one of a temperature of the fluid does not satisfy a temperature threshold or a pressure of the fluid does not satisfy a pressure threshold during the first operations, and wherein the temperature of the fluid satisfies the temperature threshold and the pressure of the fluid satisfies the pressure threshold in the second operations.

13. The system of claim 1, further including a valve coupled to the first conduit or an outlet of the heat exchanger, wherein the valve is in a closed position when a pressure of the fluid in the heat exchanger does not satisfy a pressure threshold, and wherein the valve is in an open position when the pressure of the fluid in the heat exchanger satisfies the pressure threshold.

14. The system of claim 1, further including a liquid reservoir for the fluid in the first state of the fluid coupled to the third conduit downstream of the outlet of the at least one jet pump.

15. A system comprising:
a first pump including a primary inlet, a primary outlet, a secondary inlet, and a secondary outlet;
a first conduit including an end coupled to the first pump at the secondary inlet;
a second conduit including an end coupled to the first pump at the secondary outlet;
at least one second pump including a first inlet, a second inlet, and an outlet, the first inlet coupled to the first conduit upstream of the secondary inlet, the second inlet coupled to the second conduit downstream of the secondary outlet, wherein the first inlet is configured to receive a flow of a fluid before the first pump begins operating;
a third conduit coupled to the outlet of the at least one second pump; and
a heat exchanger coupled to the first conduit upstream of the first inlet.

16. The system of claim 15, wherein the at least one second pump is an eductor.

17. The system of claim 15, further including:
a valve coupled to the first conduit; and
control circuitry to:
cause the valve to be in a first position that causes a first portion of the fluid in the first conduit upstream of the valve to flow past the valve when a pressure of the fluid does not satisfy a pressure threshold or a temperature of the fluid does not satisfy a temperature threshold, a second portion of the fluid in the first conduit upstream of the valve to flow through the first inlet of the at least one second pump when the valve is in the first position; and
cause the valve to be in a second position that blocks the fluid from flowing past the valve when the pressure of the fluid satisfies the pressure threshold and the temperature of the fluid satisfies the temperature threshold, the fluid to flow through the first inlet of the at least one second pump when the valve is in the second position.

18. The system of claim 15, further including:
a valve coupled to the second conduit; and
control circuitry to:
cause the valve to be in a first position that causes the fluid in the second conduit upstream of the valve to flow into the second inlet of the at least one second pump when a pressure of the fluid does not satisfy a pressure threshold or a temperature of the fluid does not satisfy a temperature threshold; and
cause the valve to be in a second position that blocks the fluid in the second conduit upstream of the valve from flowing into the second inlet of the at least one second pump when the pressure of the fluid satisfies the pressure threshold and the temperature of the fluid satisfies the temperature threshold.

19. A system comprising:
means for pumping including:
means for driving a fluid;
means for bearing the means for driving; and
means for containing the means for bearing, the fluid in a first state of the fluid in the means for containing during first operations, the fluid in a second state of the fluid in the means for containing during second operations after the first operations;
first means for conveying, the first means for conveying to convey the fluid in the second state of the fluid to the means for containing during the first operations;
second means for conveying to convey the fluid in the first state of the fluid away from the means for containing;

third means for conveying to convey the fluid in the first state and the second state of the fluid away from the means for containing downstream of the first means for conveying and the second means for conveying;

means for producing a pressure difference that causes the fluid from the first means for conveying and the second means for conveying to flow away from the means for containing into the third means for conveying during the first operations before the means for driving begins operating; and means for transferring heat to the fluid in the first means for conveying.

20. The system of claim 19, further comprising means for controlling operations to cause the first operations to occur when a pressure of the fluid does not satisfy a first pressure threshold or a temperature of the fluid does not satisfy a first temperature threshold, the means for controlling operations to cause the means for driving the fluid to drive the fluid during the second operations, the means for controlling operations to cause third operations to occur when at least one of (i) the pressure of the fluid does not satisfy a second pressure threshold less than the first pressure threshold or (ii) the temperature of the fluid does not satisfy a second temperature threshold less than the first temperature threshold, the means for controlling operations to prevent the means for producing the pressure difference and the means for pumping from moving the fluid during the third operations.

21. A system comprising:

a pump including a chamber, a shaft positioned at least partially in the chamber and a bearing to support the shaft, the chamber including a chamber inlet and a chamber outlet, the chamber to hold a fluid in a first state;

a first conduit to carry the fluid in a second state of the fluid, the first conduit fluidly coupled to the chamber inlet;

a second conduit to carry the fluid in the first state of the fluid, the second conduit fluidly coupled to the chamber outlet;

at least one jet pump including a first inlet fluidly coupled to a portion of the first conduit upstream of the chamber inlet, a second inlet fluidly coupled to the second conduit downstream of the chamber outlet, and an outlet to deliver a mixture of the fluid in the first state of the fluid and the second state of the fluid to a third conduit;

a first valve coupled to the first conduit between the chamber inlet and the first inlet, the first valve in a first position during first operations and in a second position during second operations; and a heat exchanger coupled to the first conduit upstream of the first inlet.

22. A system comprising:

a pump including a chamber, a shaft positioned at least partially in the chamber and a bearing to support the shaft, the chamber including a chamber inlet and a chamber outlet, the chamber to hold a fluid in a first state, wherein the bearing is a foil bearing, the fluid in the first state is liquid carbon dioxide;

a first conduit to carry the fluid in a second state of the fluid, the fluid in the second state is at least one of gaseous or supercritical carbon dioxide, the first conduit fluidly coupled to the chamber inlet;

a second conduit to carry the fluid in the first state of the fluid, the second conduit fluidly coupled to the chamber outlet;

at least one jet pump including a first inlet fluidly coupled to a portion of the first conduit upstream of the chamber inlet, a second inlet fluidly coupled to the second conduit downstream of the chamber outlet, and an outlet to deliver a mixture of the fluid in the first state of the fluid and the second state of the fluid to a third conduit; and a heat exchanger coupled to the first conduit upstream of the first inlet.

23. A system comprising:

a pump including a chamber, a shaft positioned at least partially in the chamber and a bearing to support the shaft, the chamber including a chamber inlet and a chamber outlet, the chamber to hold a fluid in a first state;

a first conduit to carry the fluid in a second state of the fluid, the first conduit fluidly coupled to the chamber inlet;

a second conduit to carry the fluid in the first state of the fluid, the second conduit fluidly coupled to the chamber outlet;

at least one jet pump including a first inlet fluidly coupled to a portion of the first conduit upstream of the chamber inlet, a second inlet fluidly coupled to the second conduit downstream of the chamber outlet, and an outlet to deliver a mixture of the fluid in the first state of the fluid and the second state of the fluid to a third conduit;

a heat exchanger coupled to the first conduit upstream of the first inlet; and a valve coupled to the first conduit or an outlet of the heat exchanger, wherein the valve is in a closed position when a pressure of the fluid in the heat exchanger does not satisfy a pressure threshold, and wherein the valve is in an open position when the pressure of the fluid in the heat exchanger satisfies the pressure threshold.

24. A system comprising:

a first pump including a primary inlet, a primary outlet, a secondary inlet, and a secondary outlet;

a first conduit including an end coupled to the first pump at the secondary inlet;

a second conduit including an end coupled to the first pump at the secondary outlet;

at least one second pump including a first inlet, a second inlet, and an outlet, the first inlet coupled to the first conduit upstream of the secondary inlet, the second inlet coupled to the second conduit downstream of the secondary outlet;

a third conduit coupled to the outlet of the at least one second pump;

a heat exchanger coupled to the first conduit upstream of the first inlet; and a valve coupled to the first conduit; and control circuitry to:

cause the valve to be in a first position that causes a first portion of fluid in the first conduit upstream of the valve to flow past the valve when a pressure of the fluid does not satisfy a pressure threshold or a temperature of the fluid does not satisfy a temperature threshold, a second portion of the fluid in the first conduit upstream of the valve to flow through the first inlet of the at least one second pump when the valve is in the first position; and cause the valve to be in a second position that blocks the fluid from flowing past the valve when the pressure of the fluid satisfies the pressure threshold and the temperature of the fluid satisfies the temperature threshold, the fluid to flow through the first inlet of the at least one second pump when the valve is in the second position.

25. A system comprising:

means for pumping including:

means for driving a fluid;

means for bearing the means for driving; and means for containing the means for bearing, the fluid in a first state of the fluid in the means for containing during first operations, the fluid in a second state of the fluid in the means for containing during second operations after the first operations;

first means for conveying, the first means for conveying to convey the fluid in the second state of the fluid to the means for containing during the first operations;

second means for conveying to convey the fluid in the first state of the fluid away from the means for containing;

third means for conveying to convey the fluid in the first state and the second state of the fluid away from the means for containing downstream of the first means for conveying and the second means for conveying;

means for producing a pressure difference that causes the fluid from the first means for conveying and the second means for conveying to flow away from the means for containing into the third means for conveying;

means for transferring heat to the fluid in the first means for conveying; and means for controlling operations to cause the first operations to occur when a pressure of the fluid does not satisfy a first pressure threshold or a temperature of the fluid does not satisfy a first temperature threshold, the means for controlling operations to cause the means for driving the fluid to drive the fluid during the second operations, the means for controlling operations to cause third operations to occur when at least one of (i) the pressure of the fluid does not satisfy a second pressure threshold less than the first pressure threshold or (ii) the temperature of the fluid does not satisfy a second temperature threshold less than the first temperature threshold, the means for controlling operations to prevent the means for producing the pressure difference and the means for pumping from moving the fluid during the third operations.

* * * * *